(12) United States Patent
Mamaril et al.

(10) Patent No.: US 12,299,271 B2
(45) Date of Patent: May 13, 2025

(54) ACTIVE ACCESSIBILITY CONTROL BAR

(71) Applicant: Microsoft Technology Licensing, LLC, Redmond, WA (US)

(72) Inventors: Bryan K. Mamaril, Seattle, WA (US); Cassandra Lynn Hoef, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 16/886,355

(22) Filed: May 28, 2020

(65) Prior Publication Data

US 2021/0373758 A1 Dec. 2, 2021

(51) Int. Cl.
*G06F 3/04883* (2022.01)
*G06F 3/0482* (2013.01)
*G06F 9/445* (2018.01)

(52) U.S. Cl.
CPC ........ *G06F 3/04883* (2013.01); *G06F 3/0482* (2013.01); *G06F 9/445* (2013.01)

(58) Field of Classification Search
CPC ................................................ G06F 3/04883
USPC ........ 715/798, 863, 788, 800, 234; 705/317, 705/37; 345/173
See application file for complete search history.

(56) References Cited

U.S. PATENT DOCUMENTS

| | | | |
|---|---|---|---|
| 5,767,850 A | 6/1998 | Ramanathan et al. | |
| 8,046,685 B2 | 10/2011 | Kishi | |
| 9,021,387 B2* | 4/2015 | Ikeda | G06F 3/04883 715/800 |
| 9,367,205 B2 | 6/2016 | Hinckley et al. | |
| 2003/0212958 A1* | 11/2003 | Altman | G06F 40/103 715/256 |
| 2007/0016875 A1* | 1/2007 | Santos-Gomez | G06F 3/0481 715/798 |

(Continued)

FOREIGN PATENT DOCUMENTS

| | | |
|---|---|---|
| CN | 103713847 A | 4/2014 |
| CN | 107807766 A | 3/2018 |

(Continued)

OTHER PUBLICATIONS

Bi, Xiaojun, "Processing Desktop Work on a Large High-Resolution Display: Studies and Designs", in Thesis for Degree of Doctor of Philosophy, University of Toronto, Jan. 1, 2011, 160 Pages.

(Continued)

*Primary Examiner* — Ruay Ho

(57) ABSTRACT

Methods and system directed to displaying title bars at a display of a large-format display are provided. More specifically, the methods and systems enable a large-format display, which may be touch-enabled, to detect where a user is interacting with the display and to provide interactive controls in an accessible location to the user. For instance, the display may detect that a user is interacting with a particular quadrant of the display based on a user gesture on or near the display, based on a user interaction with an application window on a portion of the display, based on sensor detection of a user position relative to the display, or other suitable method of detection. Accordingly, the large-format display may provide interactive controls based on the detected quadrant, gesture location, or other interaction with an application window.

19 Claims, 26 Drawing Sheets

(56) References Cited

U.S. PATENT DOCUMENTS

| | | | | |
|---|---|---|---|---|
| 2010/0114752 | A1* | 5/2010 | Downs | G06Q 40/04 |
| | | | | 705/37 |
| 2013/0120295 | A1* | 5/2013 | Kim | G06F 3/0486 |
| | | | | 345/173 |
| 2013/0125045 | A1* | 5/2013 | Sun | G06F 3/0412 |
| | | | | 715/788 |
| 2013/0283206 | A1* | 10/2013 | Kim | G06F 3/0481 |
| | | | | 715/788 |
| 2015/0082162 | A1 | 3/2015 | Cho et al. | |
| 2015/0287043 | A1* | 10/2015 | Michaelis | G06Q 10/10 |
| | | | | 705/317 |
| 2016/0103793 | A1* | 4/2016 | Fang | G06F 3/0483 |
| | | | | 715/234 |
| 2016/0307344 | A1 | 10/2016 | Monnier et al. | |

FOREIGN PATENT DOCUMENTS

| | | | |
|---|---|---|---|
| CN | 109753256 | A | 5/2019 |
| EP | 1124176 | A2 | 8/2001 |
| EP | 3401774 | A1 | 11/2018 |
| KR | 100491013 | B1 | 5/2005 |

OTHER PUBLICATIONS

Chugh, Anupam, "Android CollapsingToolbarLayout Example", Retrieved from: https://www.journaldev.com/13927/android-collapsingtoolbarlayout-example, Retrieved on Mar. 23, 2020, 20 pages.

Lischke, et al., "Interaction Techniques for Window Management on Large High-Resolution Displays", in Proceedings of the 16th International Conference on Mobile and Ubiquitous Multimedia, Nov. 26, 2017, 7 Pages.

Robertson, et al., "Large Display User Experience", in Proceedings of the IEEE Computer Graphics and Applications, Jul. 11, 2005, 11 Pages.

"International Search Report and Written Opinion Issued in PCT Application No. PCT/US21/024750", Mailed Date: Jul. 13, 2021, 15 Pages.

Communication under 71(3) Received for European Application No. 21719817.5, mailed on Oct. 30, 2024, 08 pages.

Communication 94(3) Received for European Application No. 21719817.5, mailed on Mar. 22, 2024, 5 pages.

Decision to grant a European patent pursuant to Article 97(1) Received for European Application No. 21719817.5, mailed on Jan. 8, 2025, 02 pages.

* cited by examiner

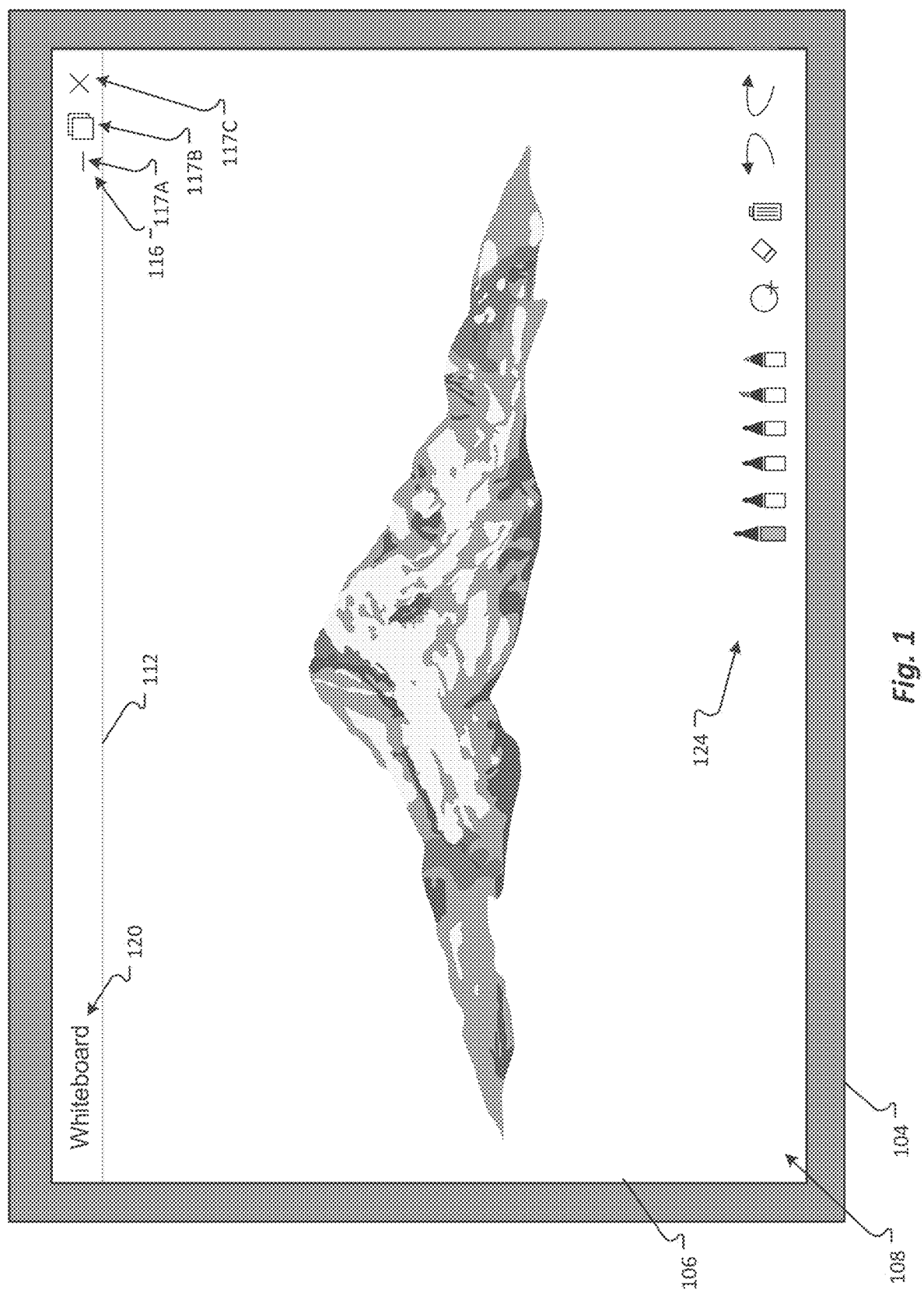

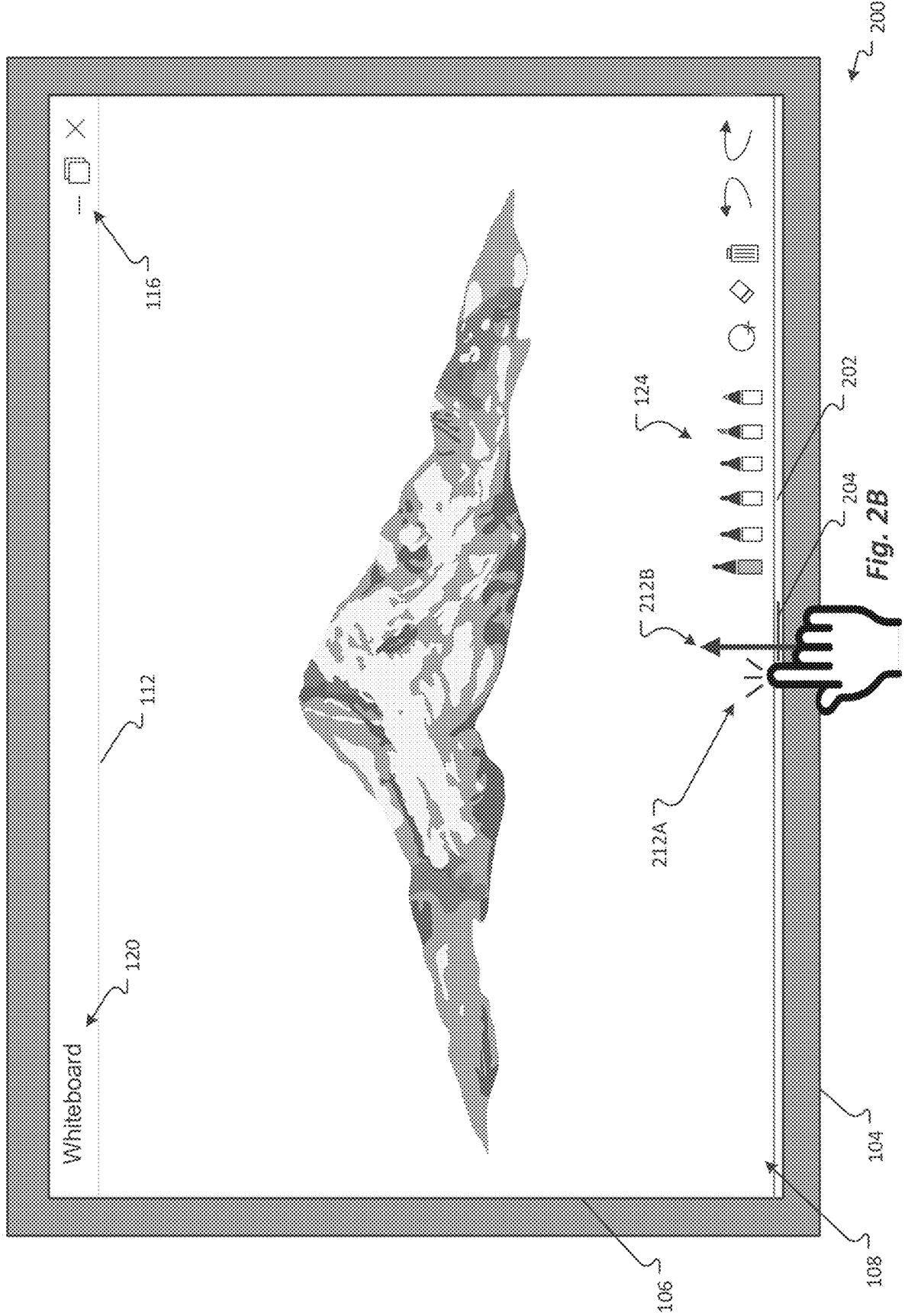

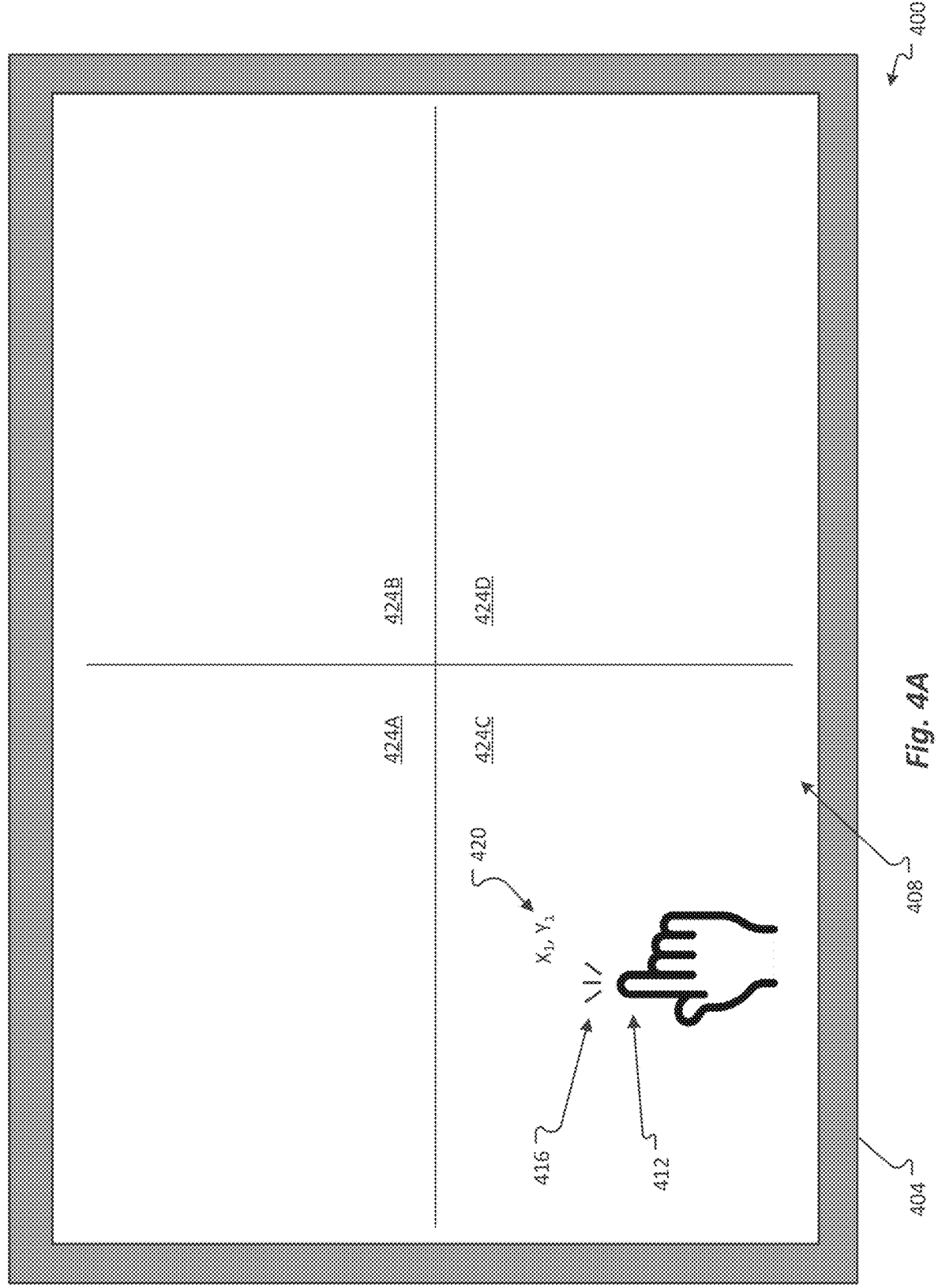

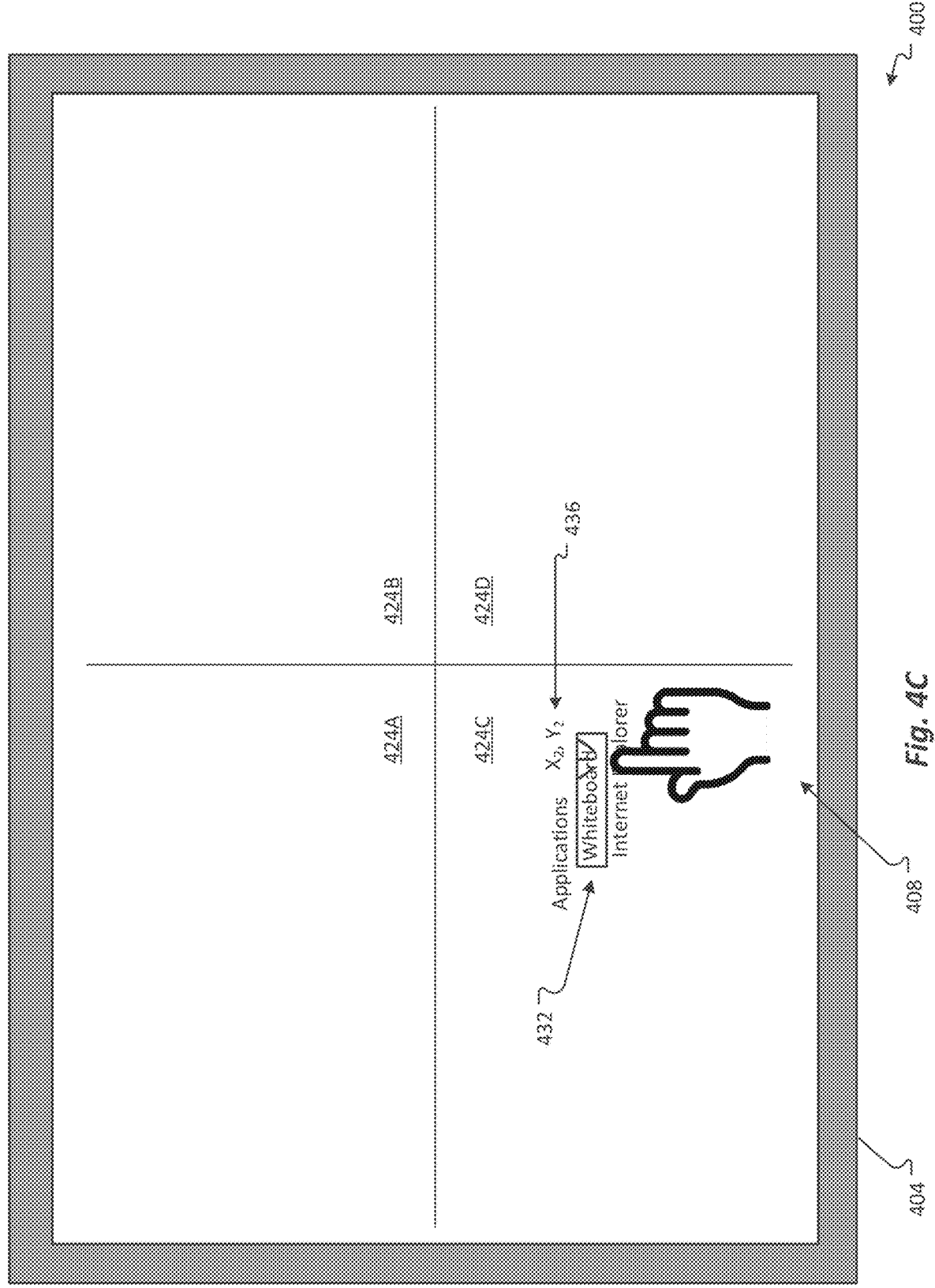

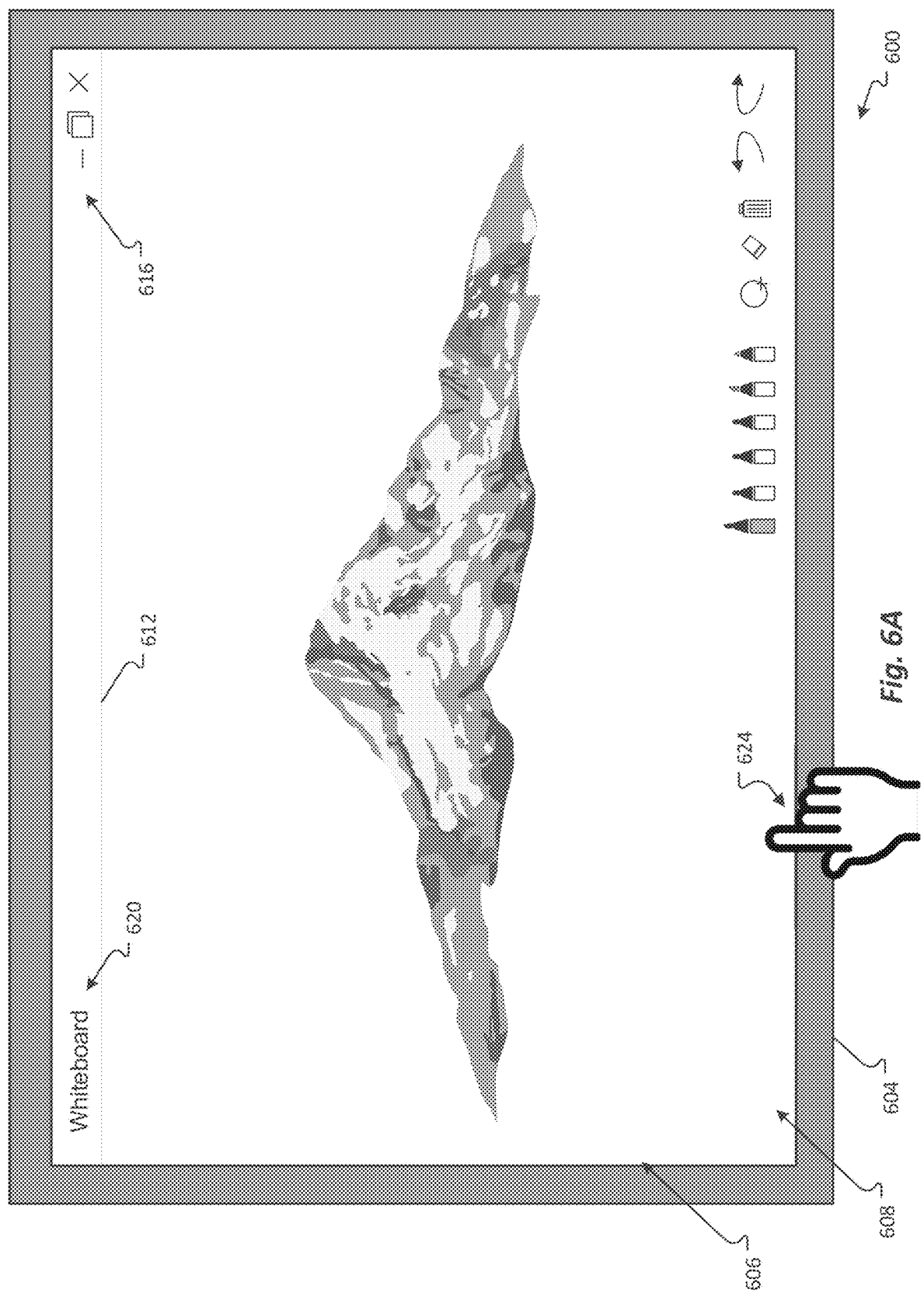

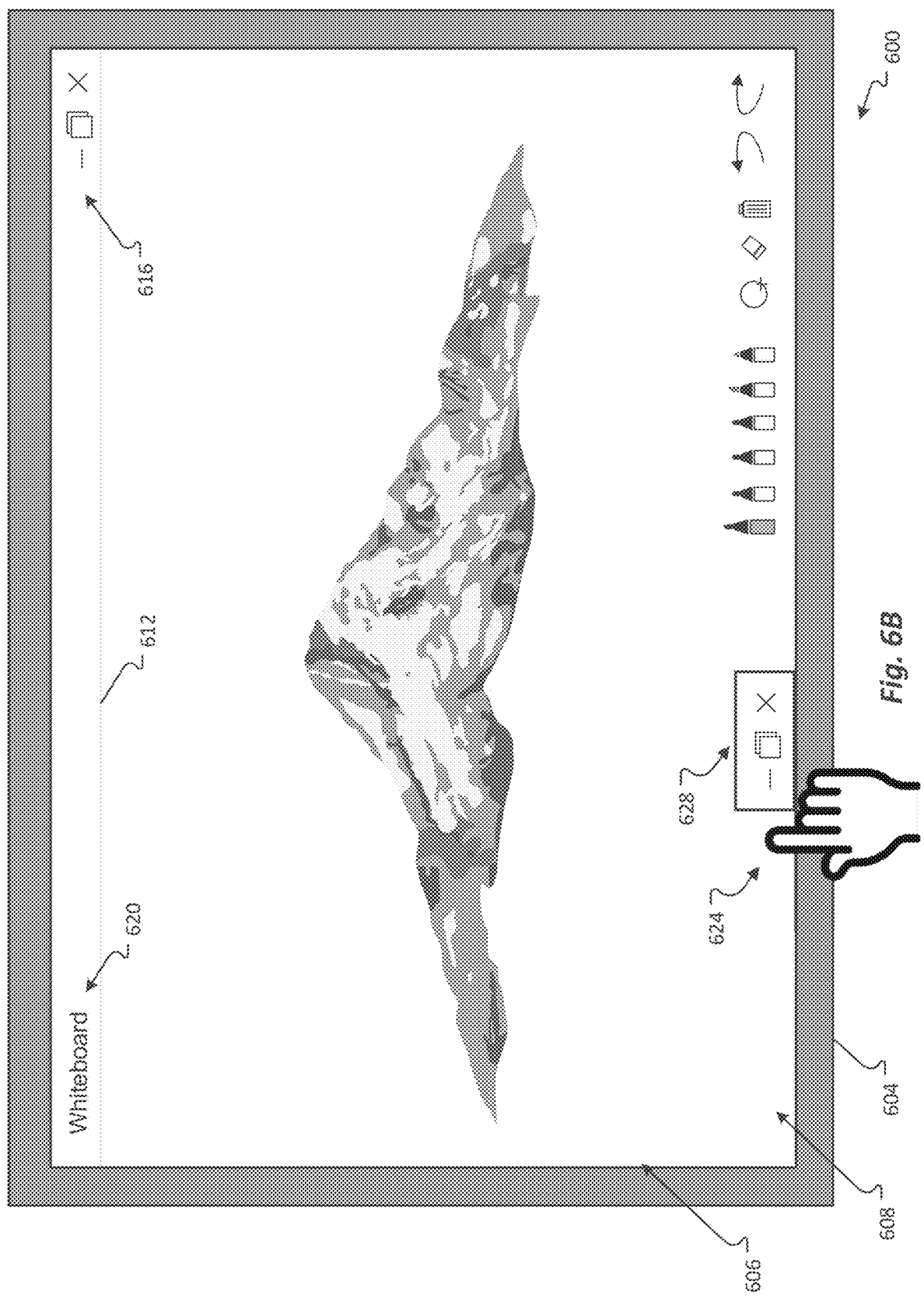

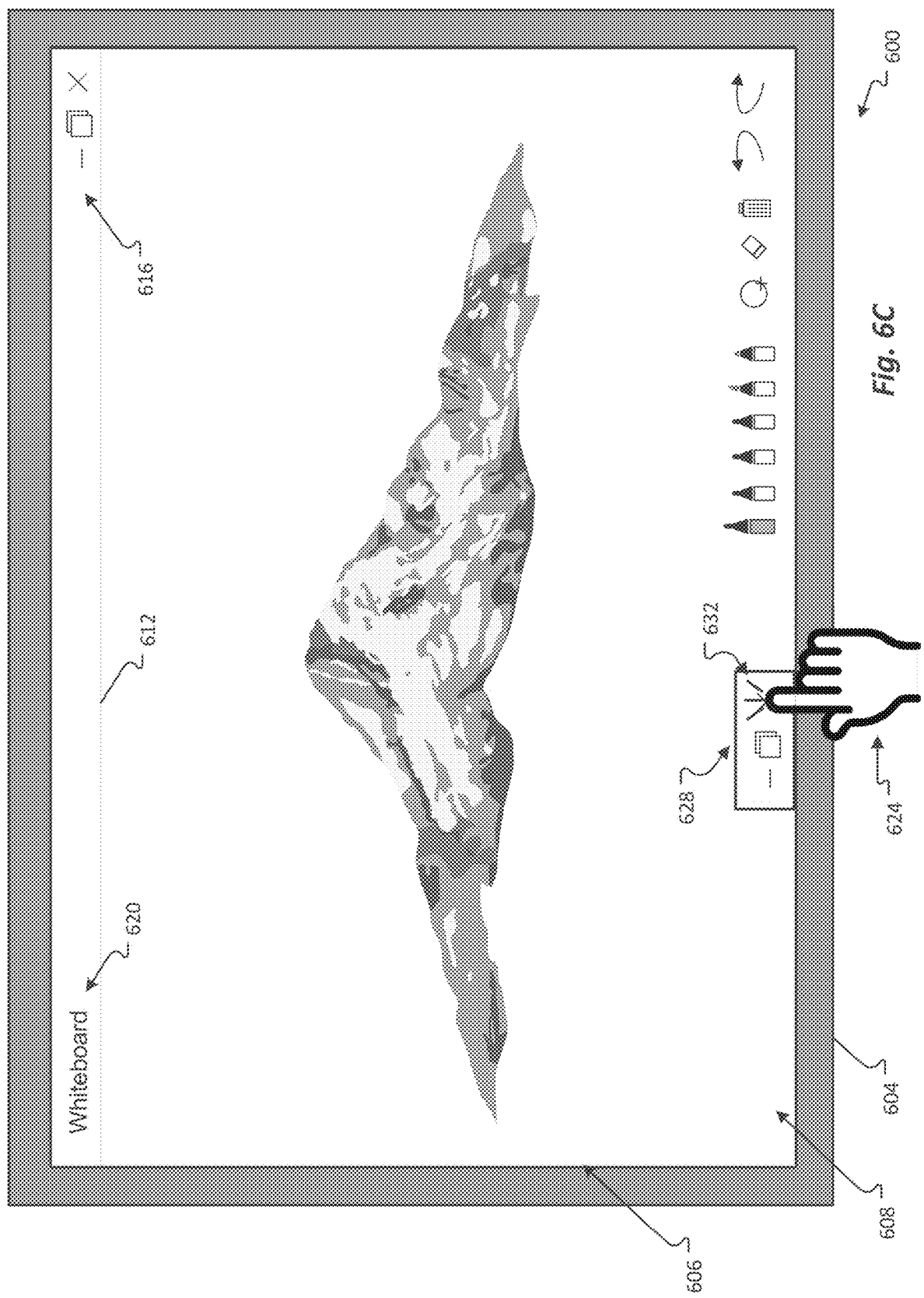

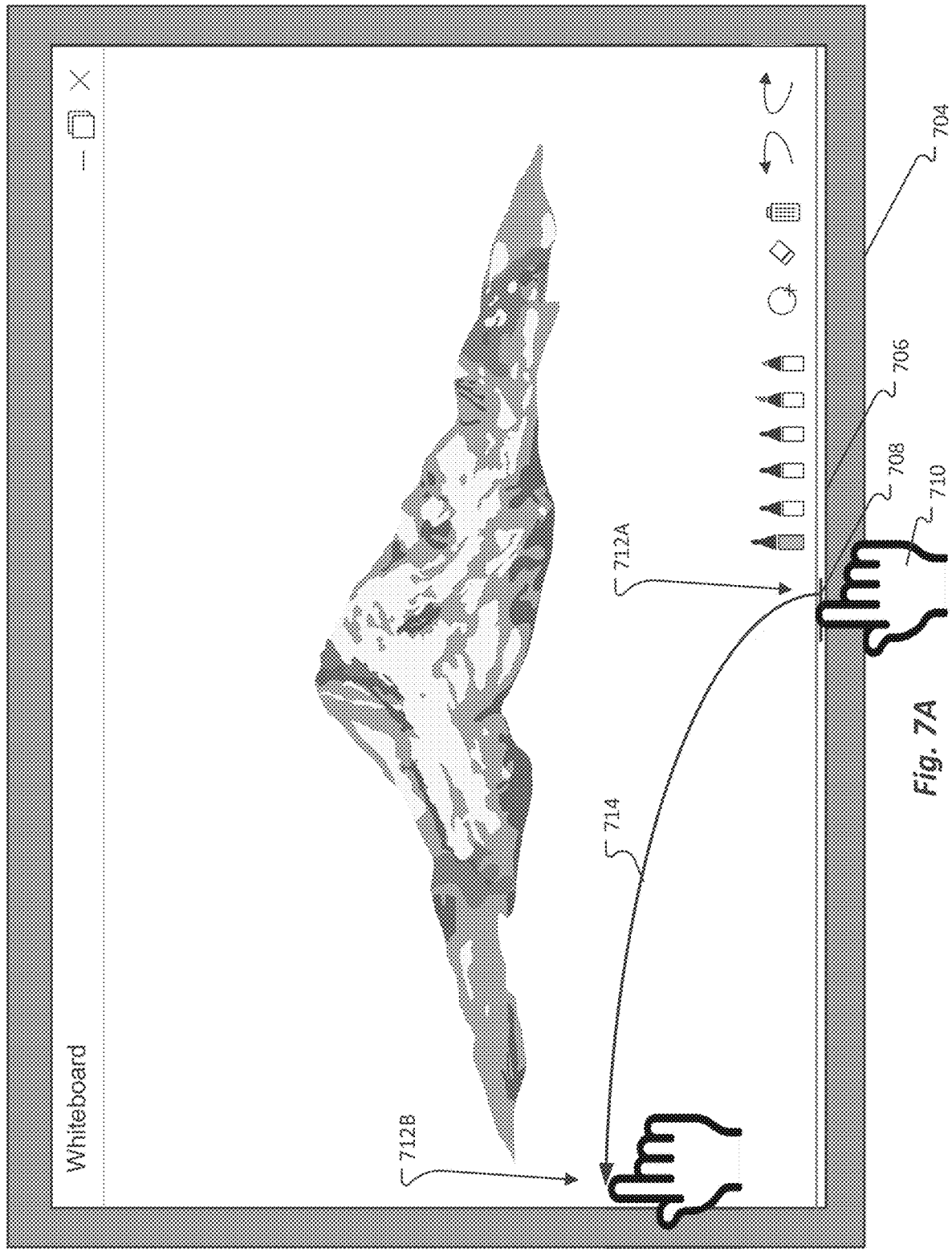

ACTIVE ACCESSIBILITY CONTROL BAR

BACKGROUND

Large-format displays, which may be touch-enabled, provide collaborative and interactive workspaces that allow multiple users to view and interact with content at the same time. Such devices may be cart mount, mounted to a wall, or provided as a table or part of a table. However, many of the large-format display are so large that interacting with content or controlling one or more windows displayed by the large-format display may be difficult. For example, a user may have difficulty navigating a large-format display when the user is presenting from an opposite side of the device, when the user is not tall enough or is seated, or when the user otherwise experiences accessibility issues reaching caption controls located in a title bar of a window, particularly when the caption controls are located in the upper right portion of a displayed window. Further, a user attempting to access the upper right portion of the displayed window may occlude or otherwise block another user's view.

SUMMARY

Accordingly, systems and methods to provide a minimized title bar in a location accessible to a user are presented. As disclosed herein, the present methods and systems enable an operating system of a large-format display, which may be touch-enabled, to detect where a user is interacting with the display and to provide interactive controls in an accessible location to the user. For instance, the display may detect that a user is interacting with a particular quadrant of the display based on a user gesture on or near the display, based on a user interaction with an application window on a portion of the display, based on sensor detection of a user position relative to the display, or other suitable method of detection. In accordance with examples of the present disclosure a method for displaying a title bar at a display of a display device is provided. The method may include displaying a first title bar in a maximized state at a first location within a viewable region of the display device. The method may further include displaying a second title bar in a minimized state at a second location within the viewable region of the display device. The method may include receiving a gesture at the display device, and then determining a third location within a viewable region of the display device associated with the received gesture. Accordingly, a determination as to whether the third location associated with the gesture at least partially coincides with the second location displaying the second title bar in the minimized state is made, and in response to the determination that the third location at least partially coincides with the second location, the method may switch the second title bar from the minimized state to a maximized state.

In addition, and in accordance with at least one example of the present disclosure, a display device is provided. The display device may include a processor and memory including instructions which when executed by the processor, causes the processor to display a first title bar in a maximized state at a first location within a viewable region of the display device and display a second title bar in a minimized state at a second location within the viewable region of the display device. The instructions may cause the process to receive a gesture at the display device and determine a third location within a viewable region of the display device associated with the received gesture. The instructions may cause the process to determine if the third location associated with the gesture at least partially coincides with the second location displaying the first title bar in the minimized state, and in response to determining that the third location at least partially coincides with the second location, switch the second title bar from the minimized state to a maximized state. Further, the instructions may cause the processor to switch the first title bar from the maximized state to a minimized state.

In accordance with at least one example of the present disclosure, a method for displaying a title bar at a display of a display device is provided. The method may include displaying a first title bar in a maximized state at a first location within a viewable region of the display device and receiving a gesture at the display device. Accordingly, the method may include determining a second location within a viewable region of the display device associated with the received gesture, displaying a second title bar in a minimized state at a third location coinciding with the second location within the viewable region of the display device, receiving a second gesture at the display device, and determining a fourth location within the viewable region of the display device associated with the received second gesture. The method may include determining if the fourth location associated with the second gesture at least partially coincides with the third location, and in response to determining that the fourth location at least partially coincides with the third location, switching the second title bar from the minimized state to a maximized state.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

FIG. 1 depicts an example of a large-format display in accordance with examples of the present disclosure;

FIG. 2B depicts details directed to invoking, or maximizing a title bar in a minimized, or shy, state along the lower edge in accordance with examples of the present disclosure;

FIG. 4A depicts details directed to invoking an application launch menu in a lower left quadrant in accordance with examples of the present disclosure;

FIG. 4C depicts additional details directed to invoking an application launch menu in the lower left quadrant in accordance with examples of the present disclosure;

FIG. 6A depicts details directed to invoking a proximal caption control bar in accordance with examples of the present disclosure;

FIG. 6B depicts additional details directed to invoking a proximal caption control bar in accordance with examples of the present disclosure;

FIG. 6C depicts additional details directed to accessing a proximal caption control bar in accordance with examples of the present disclosure;

FIG. 7A depicts details directed to moving a title bar in a minimized, or shy, state in accordance with examples of the present disclosure;

DETAILED DESCRIPTION

Figure 2A:
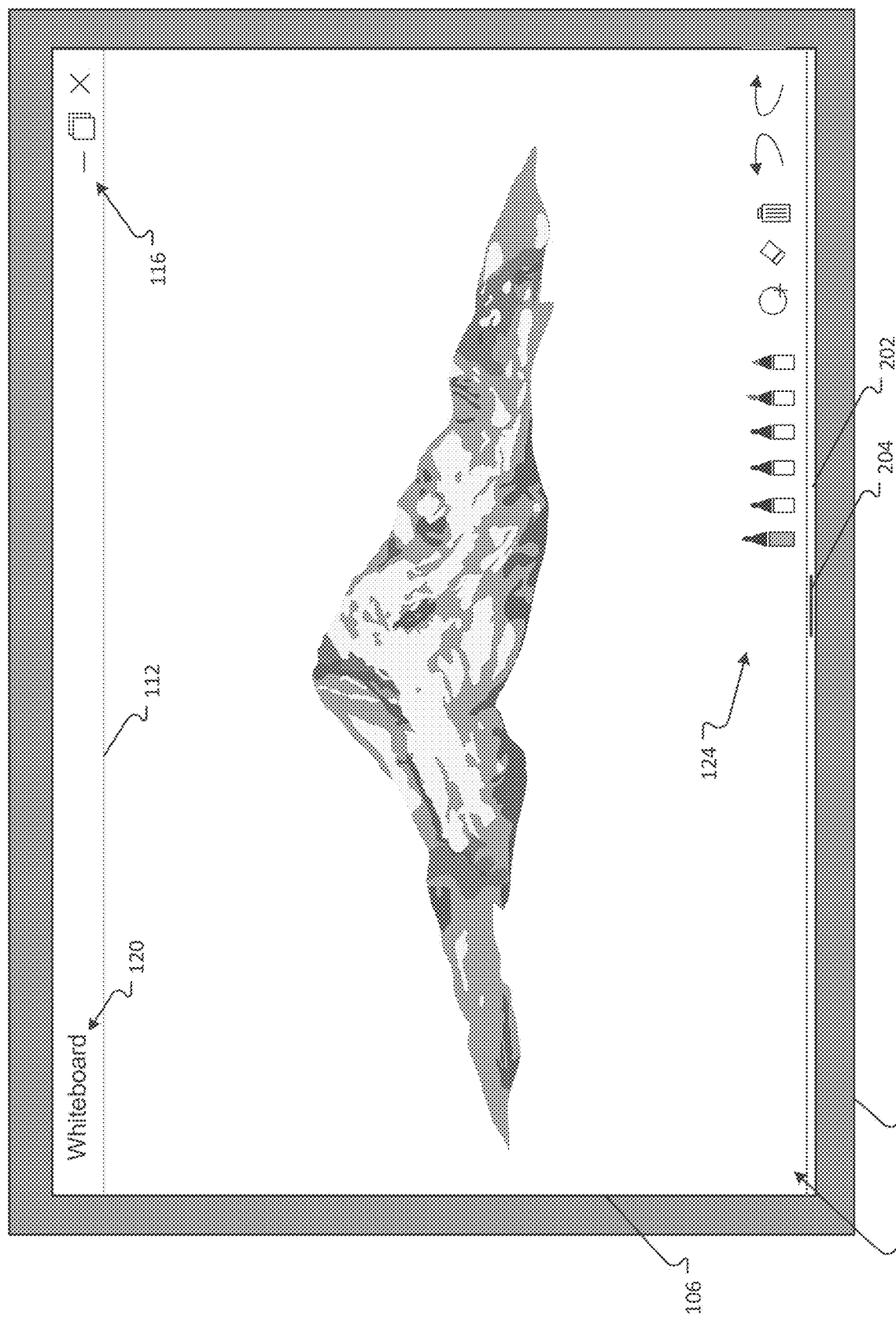
FIG. 2A depicts an example of a large-format display having an application window and a title bar in a minimized, or shy, state along a lower edge in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Many times, a large-format display may be so large that a user may have difficulty interacting with content or controlling one or more windows on the display. For example, a user may have difficulty navigating a large-format display when presenting from an opposite side of the device, when the user is not tall enough or is seated, or when the user otherwise experiences accessibility issues reaching caption controls located in a title bar of a display window, particularly when the caption controls are located in an upper right portion of a display window. Not only so, but users attempting to access the upper right portion of the display window may occlude or otherwise block other users' views. As disclosed herein, the present methods and systems enable an operating system of a large-format display to detect where a user is interacting with the display and to provide interactive controls in an accessible location to the user. For instance, the display may detect that a user is interacting with a particular quadrant of the display based on a user gesture on or near the display, based on a user interaction with an application window on a portion of the display, based on sensor detection of a user position relative to the display, or other suitable method of detection.

FIG. 1 depicts a large-format display 104 in accordance with examples of the present disclosure. The large-format display 104 may provide a collaborative interactive workspace such that multiple users may view and interact with content displayed to the large-format display 104 at the same time. The large-format display 104 may be the same as or similar to a Microsoft® Surface Hub® and may be available in a variety of different sizes and formats. The large-format display 104 may execute an application 108, such as a whiteboard application that allows one or more users to draw, comment, and/or collaborate utilizing a touch display interface. The application 108 may be executed in a window 106, where the window size, shape, and location may be changed in accordance with users' needs and/or requirements. The window 106 may be controlled by or otherwise interface with an operating system (OS) executing software to control the large-format display 104. In some examples, the operating system may provide a user interface such that a user can interact with the large-format display 104. The application 108 may provide content to the operating system such that the content is displayed in the window 106; however, the window 106 may be controlled by the operating system. An example of the operating system may include, but is not limited to Microsoft® Windows 10 Team®, Microsoft Windows 10®, etc. Further, touch input received at a surface of the large-format display 104 may be provided from the operating system to the application 108 as input.

The operating system may generate or cause to be generated the window 106, where the window 106 may include a title bar 112; the title bar 112 may include a title 120 corresponding to a title of the window being displayed or application 108 being executed. The window 106 may also include a caption control area 116 corresponding to one or more user interface controls for changing an appearance of the window 106 and/or ending execution of the application 108. For example, the caption control area 116 may include an icon 117A to configured to minimize the window 106 when selected, an icon 117B configured to expand the window 106 when selected, and/or an icon 117C configured to end the execution of the application 108 and close the window 106 when selected. Also depicted in FIG. 1 is an application menu or title bar 124; the application menu or title bar 124 may be specific to the application 108 being executed. For example, if the application 108 were to be a word processing application, the application menu or title bar 124 may correspond to a menu or title bar that controls a functionality of the word processing application and/or content of the word processing application, such as but not limited to a font, color, type, and size of a font. The processing of a selection of an icon displayed on the application menu or title bar 124 may be different from the processing of a selection of one or more of the icons 117A-117C displayed in the caption control area 116. As one example, an input corresponding to an icon selection may include a touch location, such as but not limited to an x,y coordinate. As the touch location may correspond to a location in the caption control area 116, the operating system may process the input and apply a function or command to the window 106. As another example, if the touch location corresponds to a location within the application window 106 and/or at the menu or title bar 124, the operating system may process the input and pass the input to the application 108; the application 108 may then execute a corresponding function or command consistent with the selected icon in the menu or title bar 124. In instances where a user desires to minimize the application window 106, maximize the application window 106, or close the application 108; the user may have difficulty reaching and selecting one of the icons 117A-C located in the upper right portion of the window 106. Further, a user reaching to select one or more of the icons 117A-C may block or otherwise occlude a portion of the window 106.

FIG. 2A depicts details of a shy title bar 202 in accordance with examples of the present disclosure. The shy title bar 202 may be displayed at a location that is generally more accessible to a specific user than the title bar 112. For example, the shy title bar 202 may be displayed near a bottom portion of the window 106. The shy title bar 202 may be initially displayed in a minimal state as depicted in FIG. 2A. That is, the shy title bar 202 may have a height of approximately eighteen pixels whereas the title bar 112 may have a height of approximately forty-five pixels. Further, the shy title bar 202 may include a locator, or gripper 204, that provides an indication to a user of the large-format display 104 of a location to tap and/or swipe to expose or surface a proud title bar, where the proud title bar may include the caption controls in the caption control area similar to or the same as the caption control area 116. For example, and as depicted in FIG. 2B, a user may perform a touch, tap, or press gesture in an area including or otherwise in close proximity to the gripper 204 causing the shy title bar 202 to transition from a minimized, or shy, state to a maximized, or proud, state.

That is, the touch, tap, or press gesture 212A may be received at the touch interface of the large-format display 104 and converted into a communication; the communication may then be provided to the operating system of the large-format display 104. Because a location associated with the touch, tap, or press gesture 212A is a location within the shy title bar 202, in close proximity to the shy title bar 202, and/or near the edge of the window 106, a determination may be made by the operating system, for example, that that the touch, tap, or press gesture 212A is directed to controlling or otherwise executing a command associated with the window 106. Alternatively, or in addition, a user may perform a swipe gesture 212B in an area including or otherwise in close proximity to the gripper 204 causing the shy title bar 202 to transition from a minimized, or shy, state to a maximized, or proud, state. That is, the swipe gesture 212B may be received at the touch interface of the large-format display 104 and converted into a communication; the communication may then be provided to the operating system of the large-format display 104. Because a location associated with the swipe gesture 212B is a location within the shy title bar 202, in close proximity to the shy title bar 202, and/or near the edge of the window 106, a determination may be made by the operating system, for example, that the swipe gesture 212B is directed to controlling or otherwise executing a command associated with the window 106.

Figure 2C:
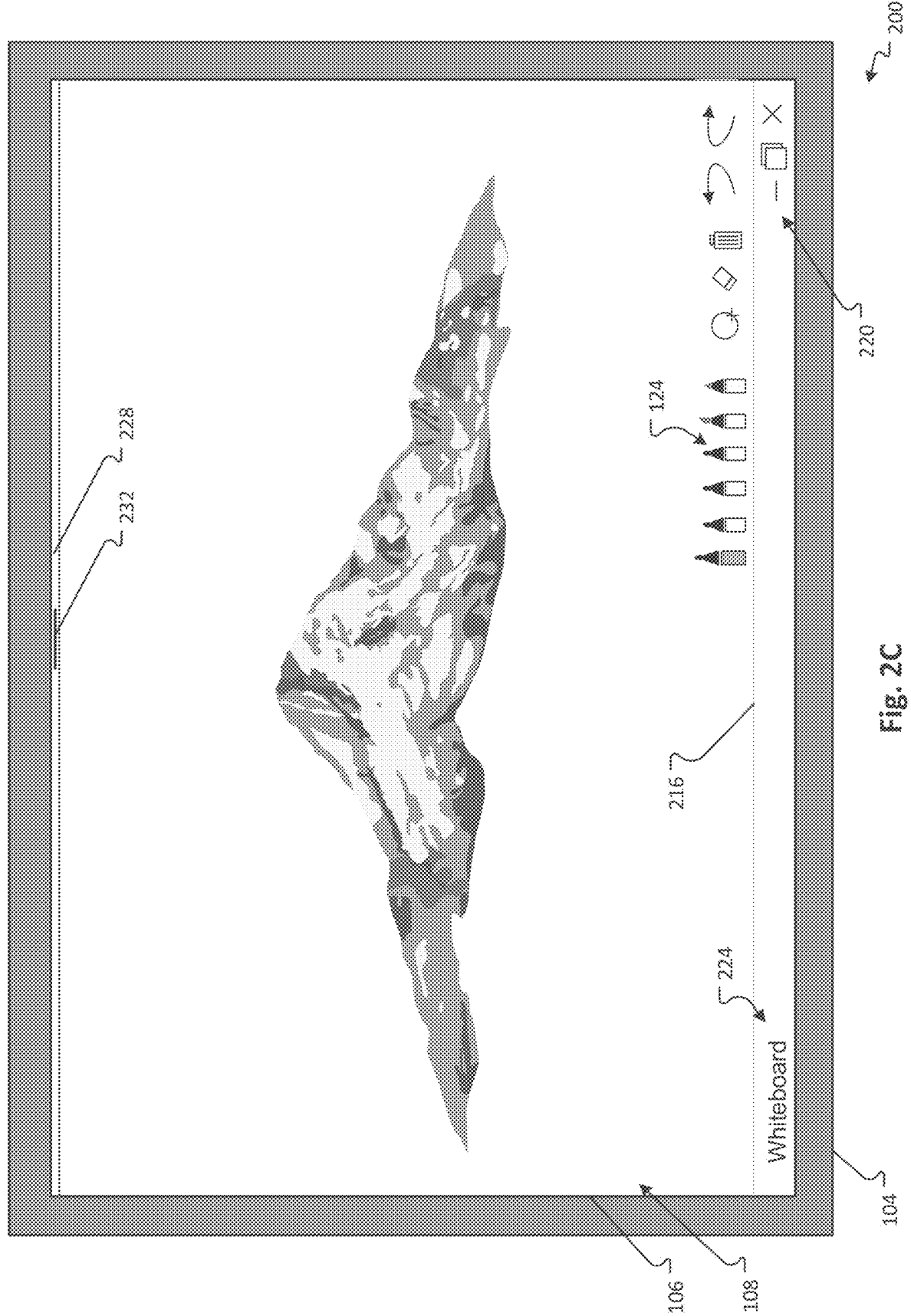
FIG. 2C depicts a title bar in a maximized, or proud, state along the lower edge in accordance with examples of the present disclosure.

Accordingly, the shy title bar 202 may transition from a minimized shy state as depicted in FIG. 2B to a maximized, or proud, state as depicted in FIG. 2C. That is, the title bar 216 may be displayed near the location of the gesture 212A and/or 212B. Similar to the title bar 112, the title bar 216 may include a title 224 corresponding to the title of the window 106 and/or the application 108. The title bar 216 may include the caption controls 220 for minimizing, maximizing, and/or closing the window 106 and/or closing the application 108. That is, the title bar 216 may display the same information and provide the same functionality as the title bar 112. As the title bar 216 provides the information and functionality previously provided in the title bar 112, the title bar 112 may transition from a maximized, or proud, state to a minimized, or shy, state. Accordingly, the window 106 may include a shy title bar 228 including a gripper 232; where the shy title bar 228 and the gripper 232 operate in the same or similar fashion as the shy title bar 202 and the gripper 204.

Figure 3A:
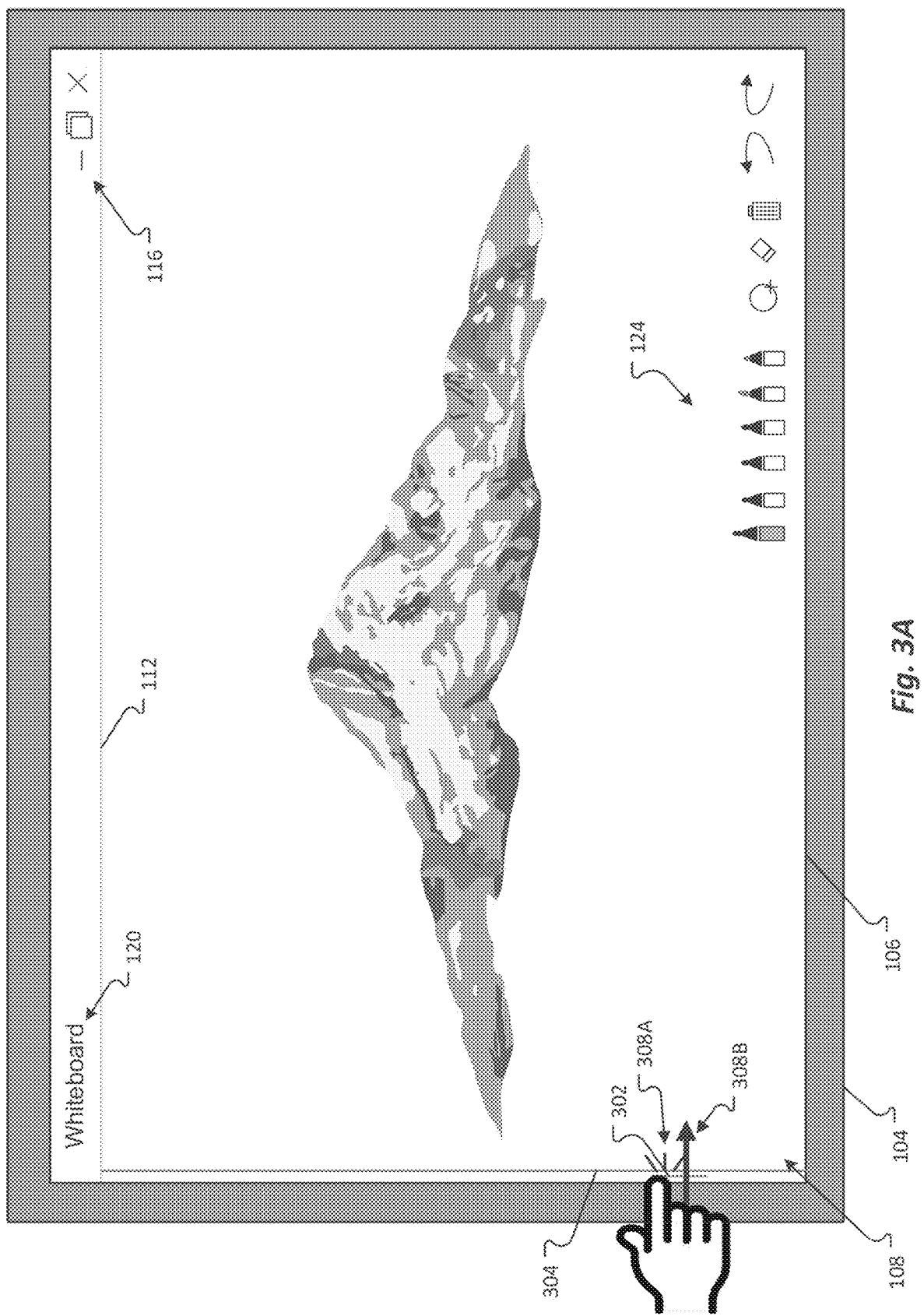
FIG. 3A depicts details directed to invoking, or maximizing a title bar in a minimized, or shy, state along a left edge in accordance with examples of the present disclosure.

As depicted in FIG. 3A, a shy title bar 304 may be provided in a location other than the bottom of the window 106. That is, the shy title bar 304 may be provided at a side of the window 106. In addition, the gripper 302 may be provided in a location other than a centered portion of the shy title bar 304. That is, the location of the gripper 302 may be dependent on one or more parameters, where the parameters may include, but are not limited to an application launch location, a location of the user, a location of the user's finger, stimulus, or other component or device interacting with the touch surface of the large-format display 104. Similar to FIGS. 2A and 2B, a user may perform a touch, tap, or press gesture in an area including or otherwise in close proximity to the gripper 302 causing the shy title bar 304 to transition from a minimized, or shy, state to a maximized, or proud, state. That is, the touch, tap, or press gesture 308A may be received at the touch interface of the large-format display 104 and converted into a communication; the communication may then be provided to the operating system of the large-format display 104. Because a location associated with the touch, tap, or press gesture 308A is a location within the shy title bar 304, in close proximity to the shy title bar 304, and/or near the edge of the window 106, a determination may be made by the operating system, for example, that that the touch, tap, or press gesture 308A is directed to controlling or otherwise executing a command associated with the window 106. Alternatively, or in addition, a user may perform a swipe gesture 308B in an area including or otherwise in close proximity to the gripper 302 causing the shy title bar 304 to transition from a minimized, or shy, state to a maximized, or proud, state.

That is, the swipe gesture 308B may be received at the touch interface of the large-format display 104 and converted into a communication; the communication may then be provided to the operating system of the large-format display 104. Because a location associated with the swipe gesture 308B is a location within the shy title bar 304, in close proximity to the shy title bar 304, and/or near the edge of the window 106, a determination may be made by the operating system, for example, that that the swipe gesture 308B is directed to controlling or otherwise executing a command associated with the window 106. Accordingly, the shy title bar 304 may transition from a minimized shy state as depicted in FIG. 3A to a maximized, or proud, state as depicted in FIG. 3C. That is, the title bar 312 may be displayed near the location of the gesture 308A and/or 308B and/or the shy title bar 304. Similar to the title bar 112, the title bar 312 may include a title 320 corresponding to the title of the window 106 and/or the application 108. The title bar 312 may include the caption controls 316 for minimizing, maximizing, and/or closing the window 106 and/or closing the application 108. That is, the title bar 312 may display the same information and provide the same functionality as the title bar 112. In some examples, the caption controls 316 may be displayed near the location of the gesture 308A and/or 308B. As the title bar 312 provides the information and functionality previously provided in the title bar 112, the title bar 112 may transition from a maximized, or proud, state to a minimized, or shy, state. Accordingly, the window 106 may include a shy title bar 324 including a gripper 328; where the shy title bar 324 and the gripper 328 operate in the same or similar fashion as the shy title bar 304 and the gripper 302.

In aspects, the shy title bar 304 may be provided in a location according to a user position. For example, if a user is located at a side of the large-format display 104, the user's position may be detected and the shy title bar 304 may be provided in a location closest to the detected position of the user. The user's position may be detected by one or more sensors of the large-format display 104. The one or more sensors may include, but are not limited to a camera and a proximity sensor. Accordingly, the one or more sensors may detect a user, determine a position and provide the determined position, or location, to the operating system. The operating system may then cause the shy title bar 304 to be rendered according to the determined position of the user.

Figure 4B:
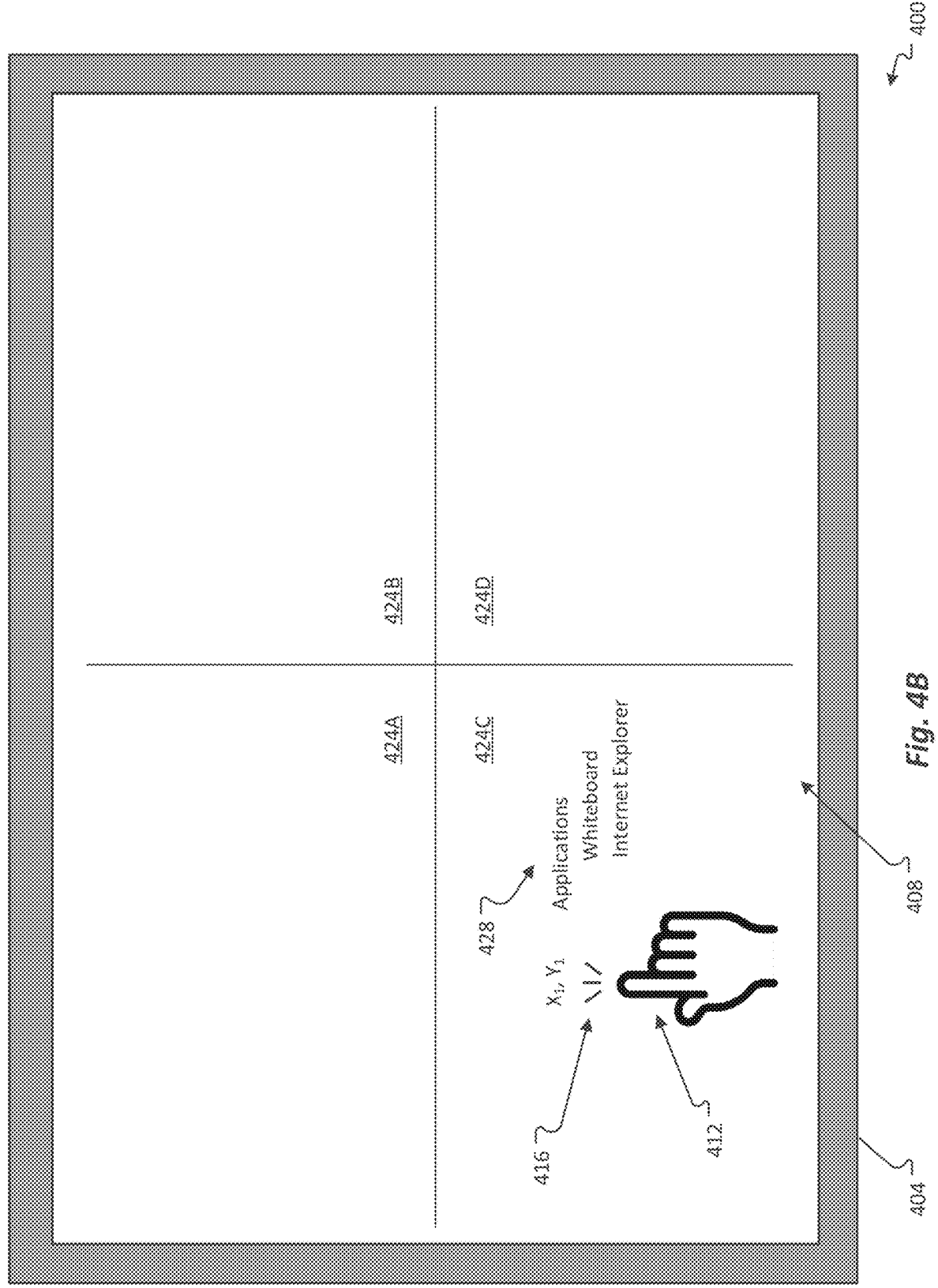
FIG. 4B depicts additional details directed to invoking an application launch menu in the lower left quadrant in accordance with examples of the present disclosure.

FIGS. 4A-4D depict additional details directed to determining a location to place the shy title bar in accordance with examples of the present disclosure. More specifically, the location of the shy title bar may be based on a location associated with an application launch. As depicted in FIG. 4A, a large-format display 404, which may the same as or similar to the large-format display 104, is depicted prior to an application having a shy title bar being executed or otherwise launched. That is, FIG. 4A does not show a window, such as window 106, or an application, such as application 108 as previously discussed. Instead, the background 408 may be displayed. The user may perform a gesture 416, such as a tap, touch, press, long press, or other gesture with the user's finger 412 and/or a stylus indicating that the user would like to select a location on the touchscreen of the large-format display 404. In some examples, the gesture may correspond to an approach gesture, where a user's finger 412 or a stylus may be approaching the touch screen display of the large-format display 404. Accordingly, contact with the touch screen display of the large-format display 404 may be avoided. Accordingly, a communication including a location, such as the location $X_1, Y_1$ 420 may be provided to the operating system of the large-format display 404. In other examples, an area may be provided to the operation system; for example, the quadrant 424C may be provided to the operating system. Although quadrants 424A-424D are depicted, it is contemplated that the touch screen display of the large-format display may be divided into more or less areas of equal or unequal size.

As depicted in FIG. 4B, a listing 428 of available applications and/or executables may be provided or otherwise displayed to the user. For example, applications may be grouped in a folder, where the folder contents may include, but is not limited to a Whiteboard application and Internet Explorer. As depicted in FIG. 4C, a user may select one of the displayed applications and/or executables to launch. For example, a user may perform a gesture 432 at a location $X_2, Y_2$; such gesture 432 may result in a selection of a corresponding application and cause the corresponding application to be launched or otherwise executed by the operation system of the large-format display 404. During, and/or after the launching of the application, one or more of locations 420 and 436 may be provided to the operating system. Accordingly, the operating system may cause a title bar 440 to be rendered based on one or more of the locations 420 and 436. The title bar 440 may include the title 448 of the window and/or application and the caption controls 444. In some examples, the caption controls 444 may be located in a corner closest to one or more of the locations 420 and 436. In some examples, the caption controls 444 may be located based on a quadrant in which the one or more of the locations 420 and 436 are located. Further, as the proud, or maximized, title bar 440 may be displayed in the bottom of the window 406, a shy title bar 452 may be located in the upper portion of the window 406. As previously discussed, the shy, or minimized, title bar 452 may include a gripper 456 for expanding the shy title bar 452 into a proud title bar.

Figure 5A:
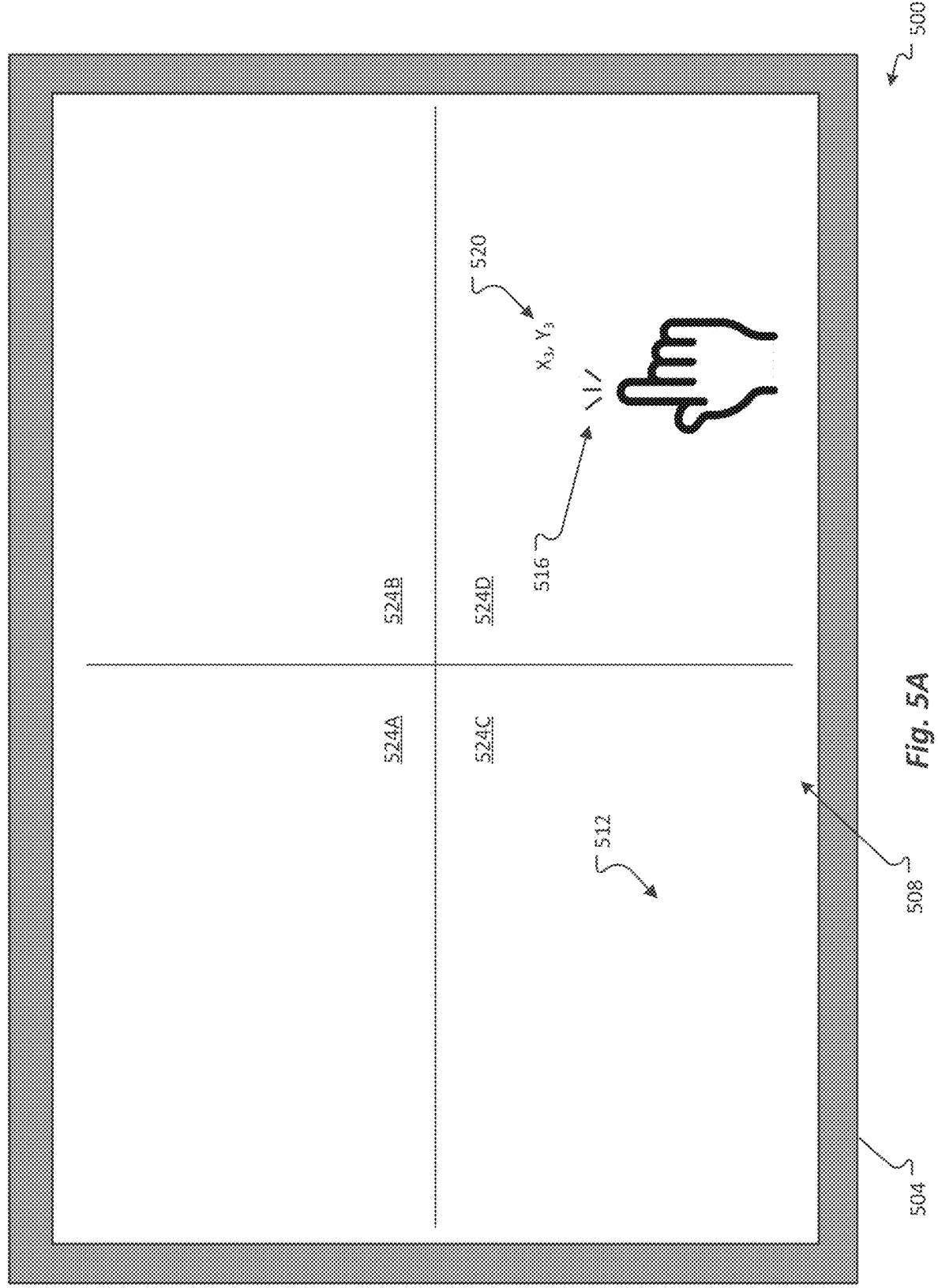
FIG. 5A depicts details directed to invoking an application launch menu in a lower right quadrant in accordance with examples of the present disclosure.
Figure 5B:
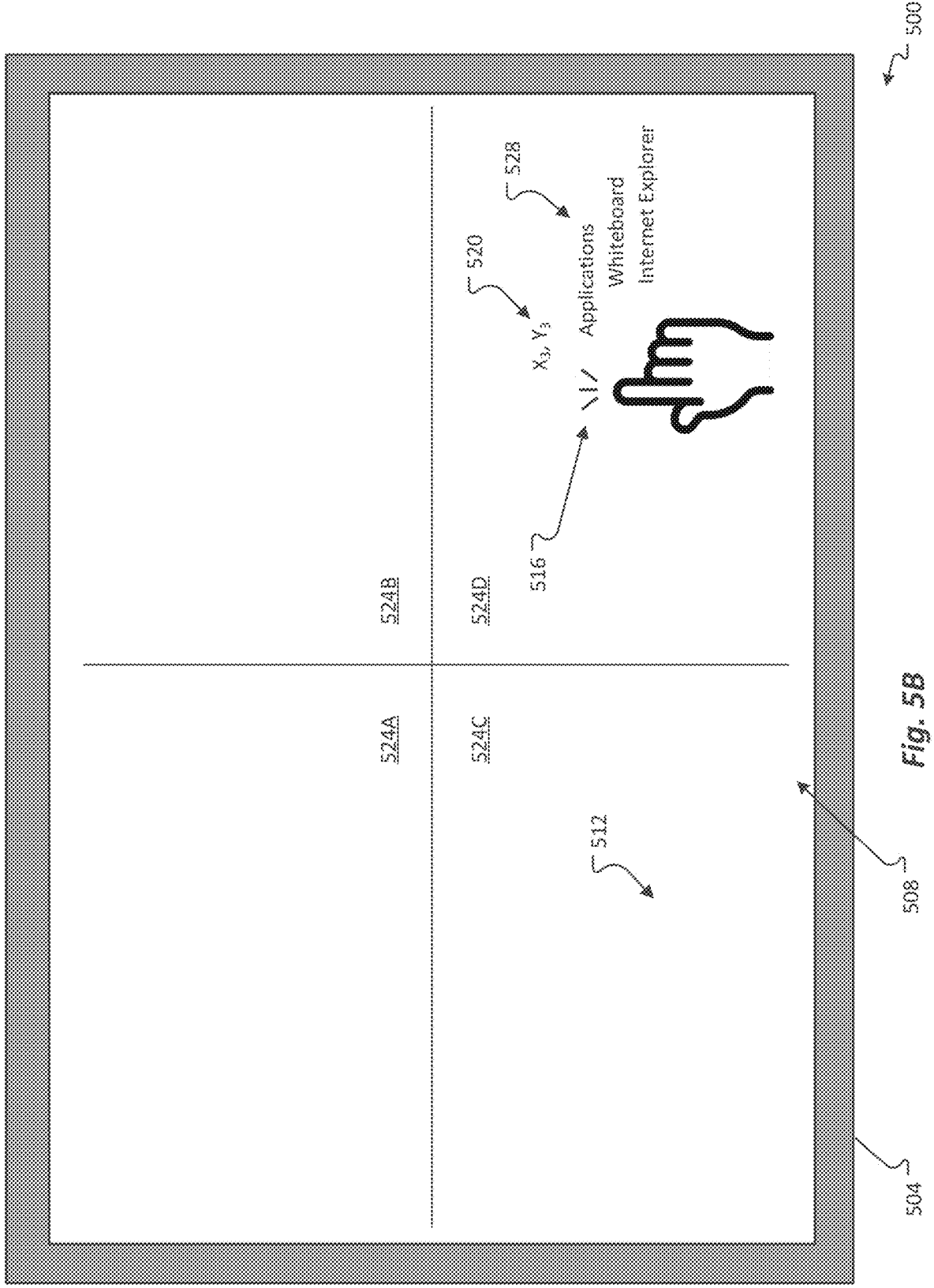
FIG. 5B depicts additional details directed to invoking an application launch menu in the lower right quadrant in accordance with examples of the present disclosure.
Figure 5C:
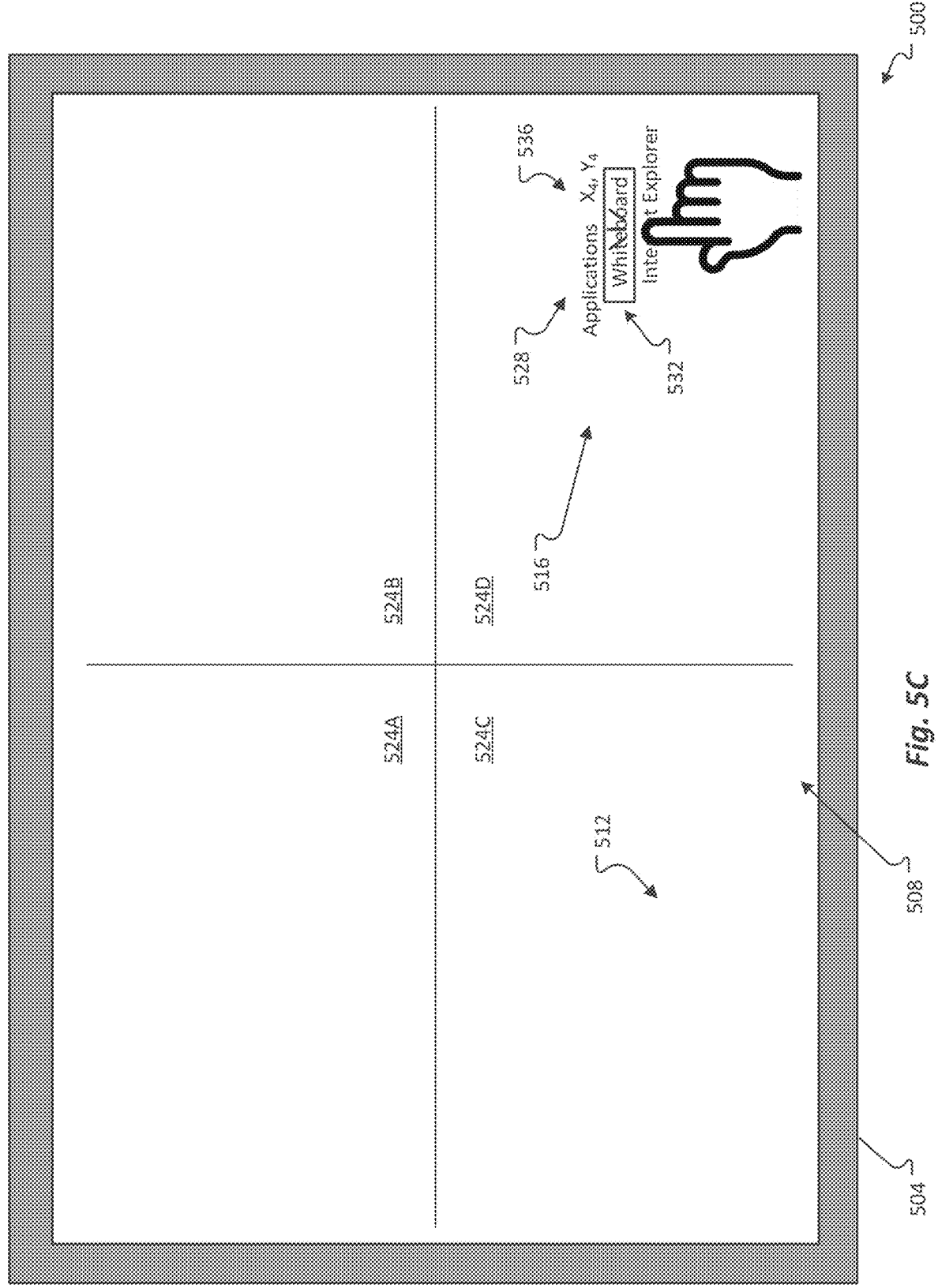
FIG. 5C depicts additional details directed to invoking an application launch menu in the lower right quadrant in accordance with examples of the present disclosure.

FIGS. 5A-5D depict additional details directed to determining a location to place the shy title bar in accordance with examples of the present disclosure. More specifically, the location of the shy title bar may be based on a location associated with an application launch. As depicted in FIG. 5A, a large-format display 504, which may the same as or similar to the large-format display 104, is depicted prior to an application having a shy title bar being executed or otherwise launched. That is, FIG. 5A does not show a window, such as window 106, or an application, such as application 108 as previously discussed. Instead, the background 508 may be displayed. The user may perform a gesture 516, such as a tap, touch, press, long press, or other gesture with the user's finger 512 and/or a stylus indicating that the user would like to select a location on the touchscreen of the large-format display 504. In some examples, the gesture may correspond to an approach gesture, where a user's finger 512 or a stylus may be approaching the touch screen display of the large-format display 504. Accordingly, contact with the touch screen display of the large-format display 504 may be avoided. A communication including a location, such as the location $X_3, Y_3$ 520 may be provided to the operating system of the large-format display 504. In other examples, an area may be provided to the operation system; for example, the quadrant 524D may be provided to the operating system. Although quadrants 524A-524D are depicted, it is contemplated that the touch screen display of the large-format display may be divided into more or less areas of equal or unequal size.

In some examples, the location of the shy title bar may be based on a location associated with a gesture unrelated to an application launch and/or an input to a background display or wallpaper. For example, a location of a gesture corresponding to an interaction with the toolbar 124 may be utilized to determine the location of the shy title bar and/or the location of the caption controls within a proud title bar when displayed. Accordingly, as a user interacts with the display device, a last known location and/or an average location based on user interactions may be utilized to determine the location of the shy title bar and/or the location of the caption controls within a proud title bar when displayed.

FIGS. 6A-6C depict additional details directed to a proximal title bar and/or a proximal caption control area. For example, a window 606 displayed at a touchscreen of the large-format display 604 and executing an application 608 is shown in FIG. 6A. The window 606 further includes a title bar 612 including a title 620 of the application 608 or window 606 and the caption control area 616. A user's hand, finger, or a stylus device 624 may approach the touchscreen of the large-format display 604. The approach of the user's hand, finger, or a stylus device 624 may be detected by one or more sensors of the large-format display 604. Non-limiting examples of the one or more sensors may include a camera and/or a translucent or transparent digitizer located within one or more layers of the touchscreen of the large-format display 604. As depicted in FIG. 6, based on the location of the user's hand, finger, or a stylus device 624 with respect to the touch screen and an edge of the window 606, a caption control area 628 may be displayed. The caption control area may be the same as or similar to the caption control area 616. Accordingly, as depicted in FIG. 6C, the user's hand, finger, or a stylus device 624 may select 632 one of the selectable icons of the caption control area 628 with one or more gestures.

Figure 7B:
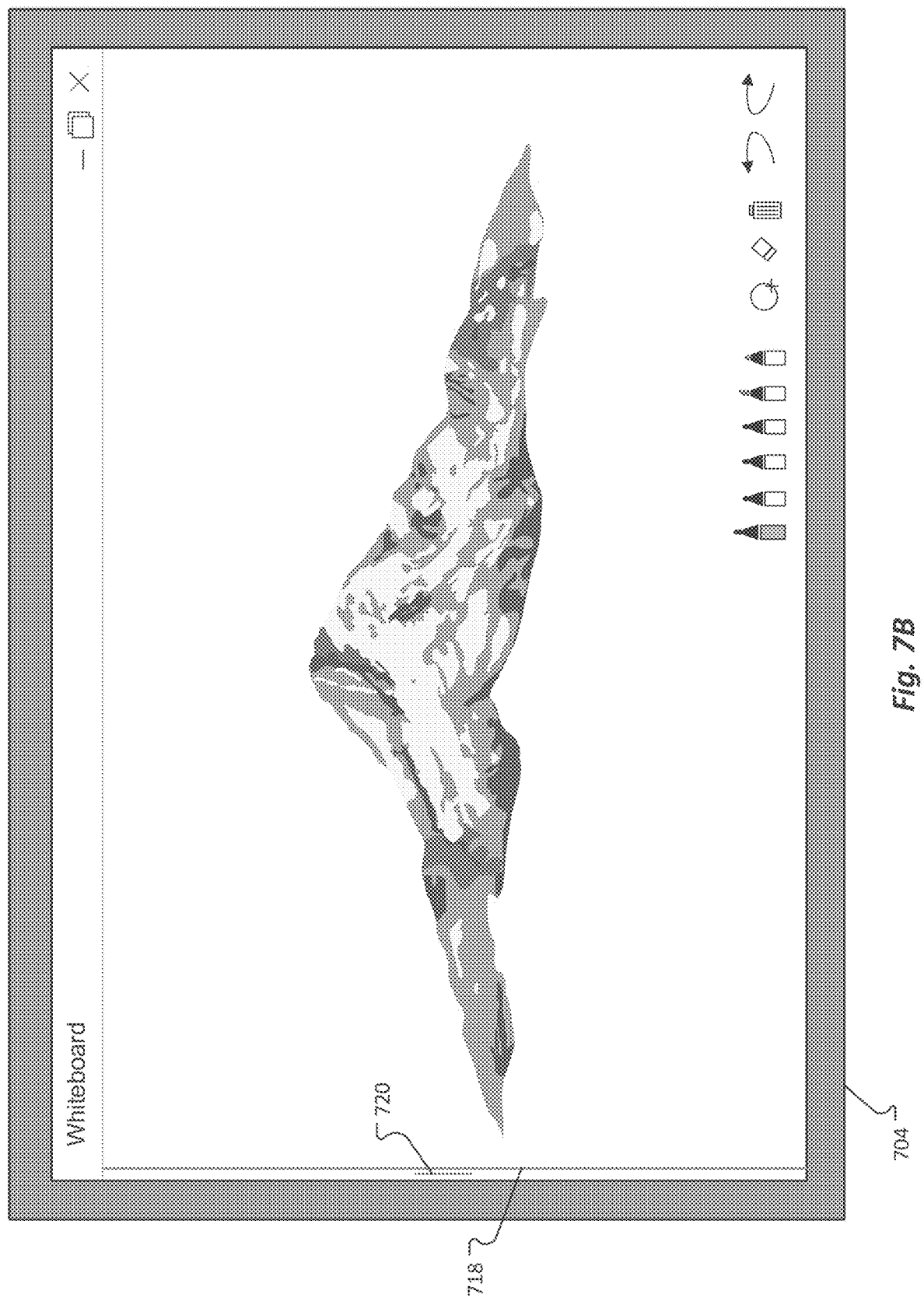
FIG. 7B depicts additional details directed to moving a title bar in a minimized, or shy, state in accordance with examples of the present disclosure.

FIGS. 7A-7B depict one or more details associated with moving a title bar 706 in a minimized, or shy, state. That is, the title bar 706 having the gripper 708 may be moved from a first location to a second location. Accordingly, a user's hand, finger, or a stylus 710 may contact the touchscreen of the large-format display, and utilizing a drag motion, drag the title bar from the first location 712A to the second location 712B along the path 714. As depicted in FIG. 7B, the title bar 718, in the minimized, or shy, state is now located at the size of the large-format display 704.

Figure 8:
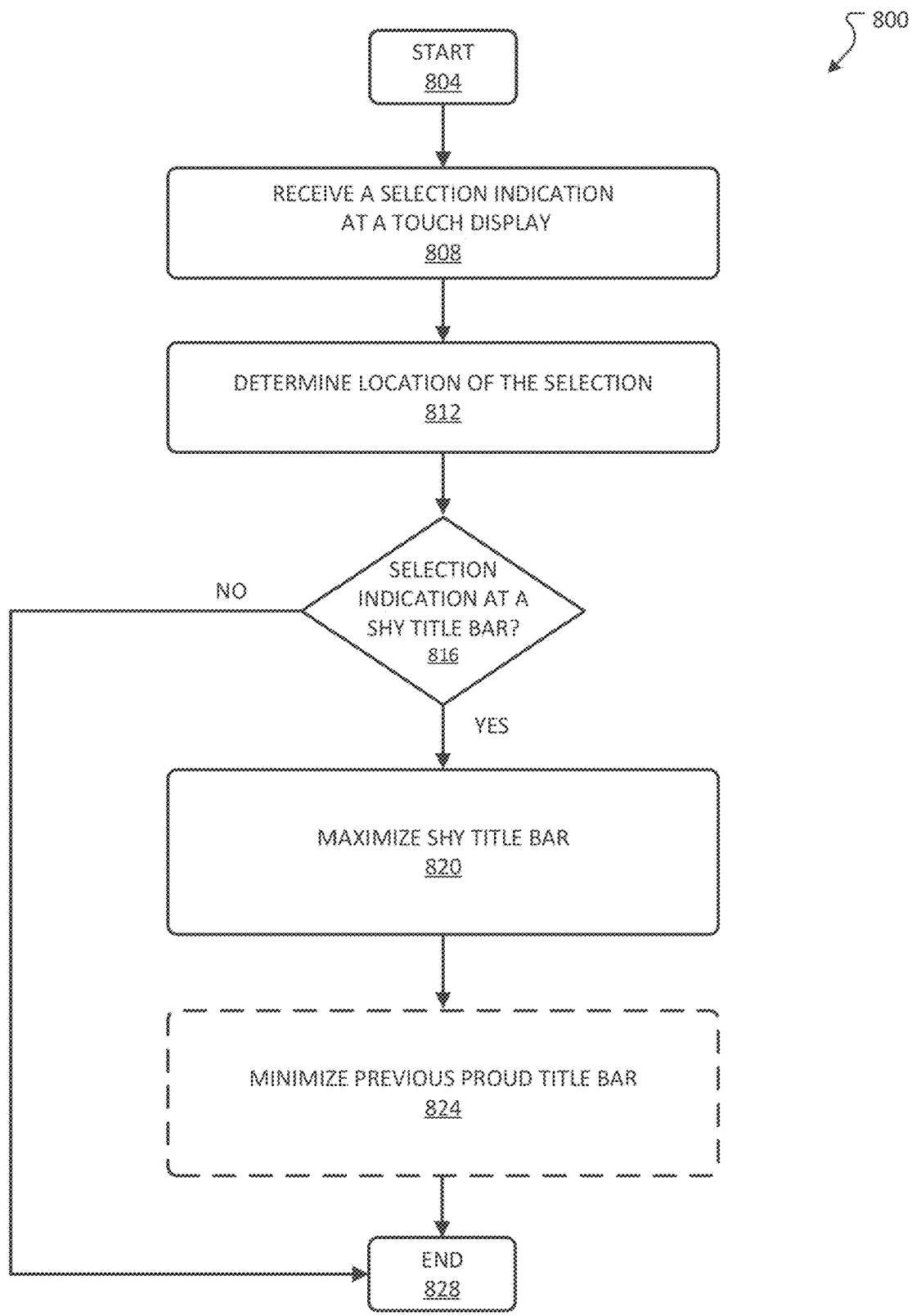
FIG. 8 depicts a first flow chart in accordance with examples of the present disclosure.

FIG. 8 depicts details of a method 800 for causing a title bar in the minimized, or shy, state to be rendered to a display and displayed to a user in accordance with examples of the present disclosure. A general order for the steps of the method 800 is shown in FIG. 8. Generally, the method 800 starts at 804 and ends at 828. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, Application Specific Integrated Circuit (ASIC), a field programmable gate array (FPGA), a system on chip (SOC), or other hardware device. Hereinafter, the method 800 shall be explained with reference to the systems, components, modules, software, data structures, user interfaces, etc. described in conjunction with FIGS. 1-7B.

The method starts at 804, where flow may proceed to 808. At 808, a selection indication may be received at a touch interface of a display. The selection indication may correspond to actual contact with a touch interface of the display; in some examples, the selection indication may be received as a non-contact type of selection. For example, a finger or stylus approaching the touch interface may cause a selection indication event to be received. The selection indication may be received at the touch interface of the display, such as the large-format display 104. In some examples, the selection indication may be received from another sensor, such as a camera. The selection indication may then be communicated to the operation system of the large-format display. The selection indication may correspond to a type of gesture (e.g., touch, press, swipe, etc.) and may include location information. At 812, the location of the selection may be determined. For example, the location may correspond to an X,Y coordinate and/or a partition area, such as a quadrant of the touch display. The method 800 may the proceed to 816, where the operating system may determine if the location of the selection indication corresponds to a title bar in the minimized, or shy, state. If the location of the selection indication corresponds to the shy title bar, the operating system may perform a command and/or function, such as maximize the shy title bar at 820. If the location of the selection indication does no correspond to the shy title bar, the operating system may proceed to 828 and the method 800 may end. In accordance with some examples, after maximizing the shy title bar at 820, the method 800 may minimize a previously displayed title bar in the maximized, or proud, state at 824. In some examples however, both the shy title bar that was maximized at 820 and a previously existing title bar may be displayed. The method 800 may end at 828.

Figure 9A:
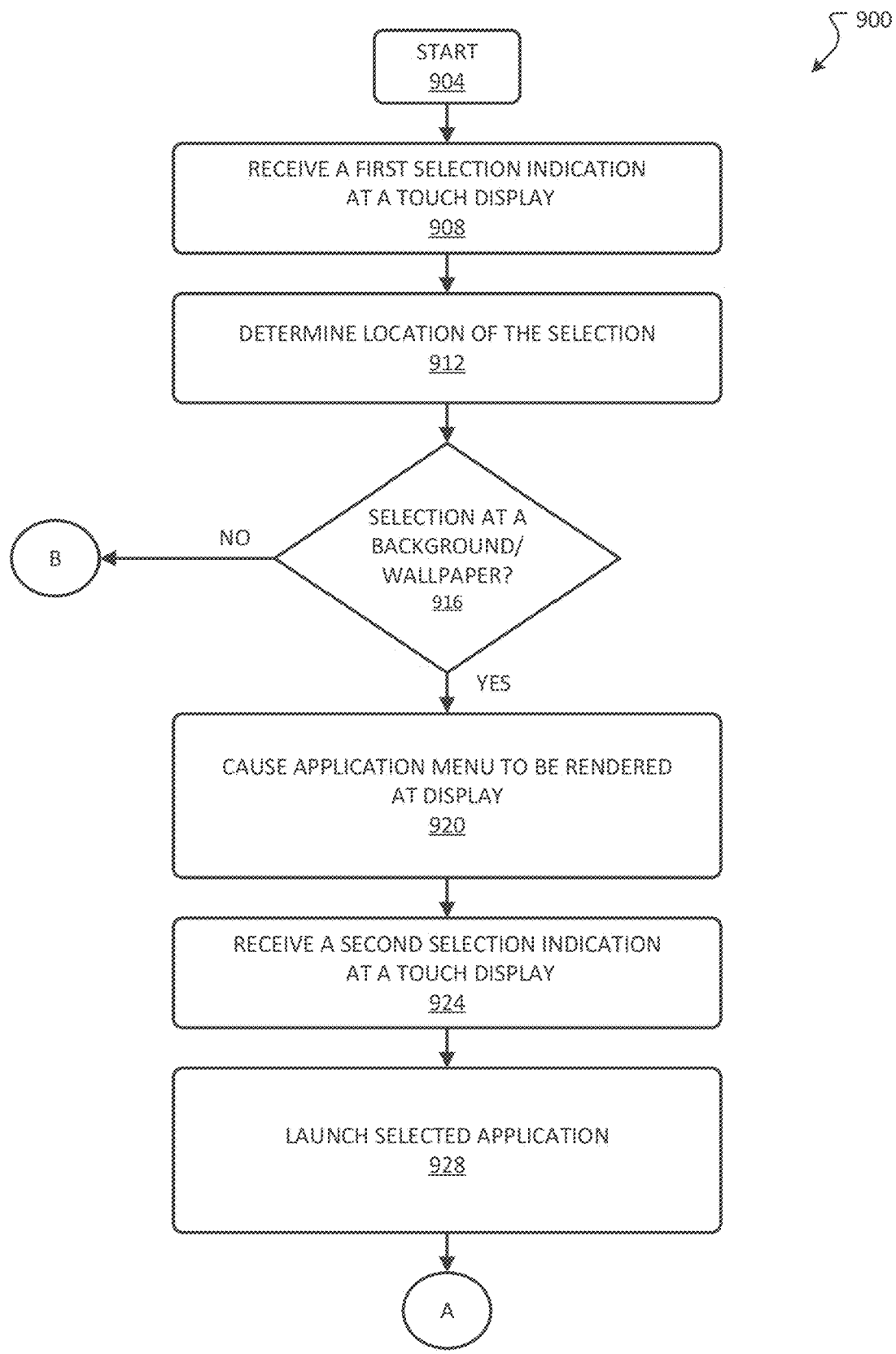
FIG. 9A depicts a second flow chart in accordance with examples of the present disclosure.
Figure 9B:
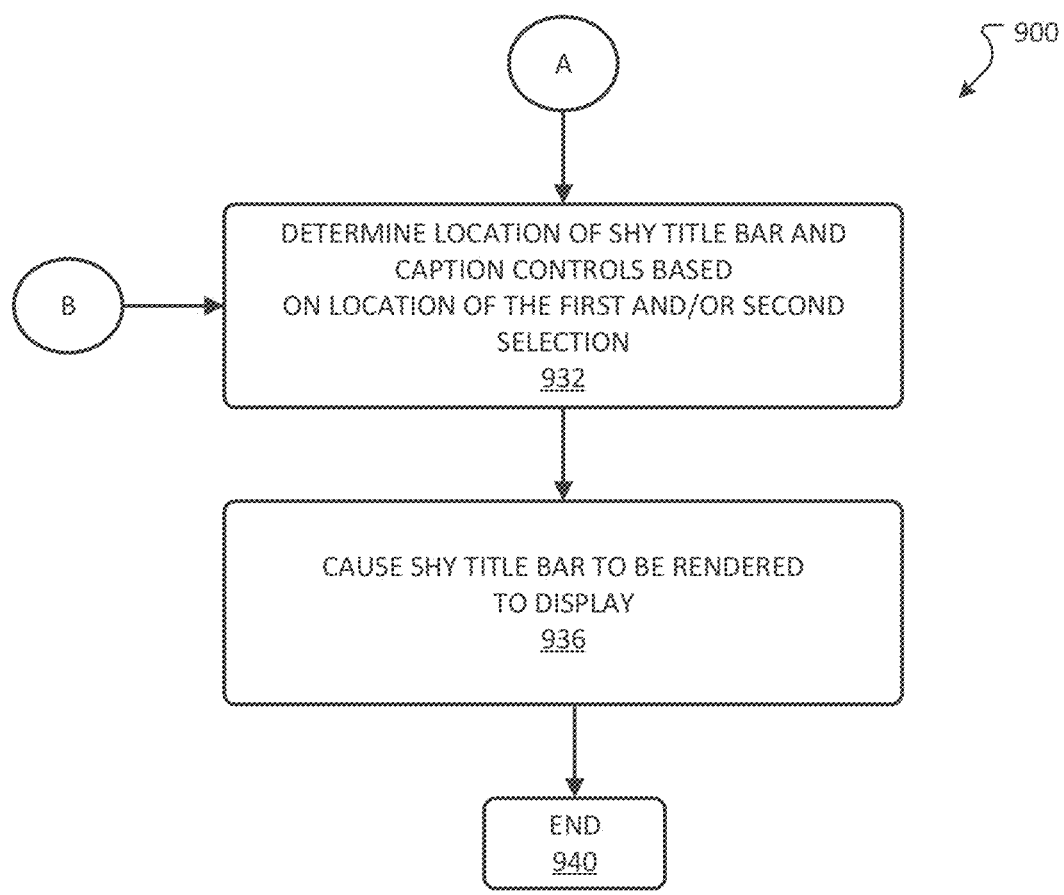
FIG. 9B depicts additional details of the second flow chart in accordance with examples of the present disclosure.

FIGS. 9A-9B depict details of a method 900 for determining a location of a shy title bar and/or a location of one or more caption controls in a title bar in accordance with examples of the present disclosure. A general order for the steps of the method 900 is shown in FIGS. 9A-9B. Generally, the method 900 starts at 904 and ends at 940. The method 900 may include more or fewer steps or may arrange the order of the steps differently than those shown in FIGS. 9A-9B. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), or other hardware device. Hereinafter, the method 900 shall be explained with reference to the systems, components, modules, software, data structures, user interfaces, etc. described in conjunction with FIGS. 1-8.

Figure 4D:
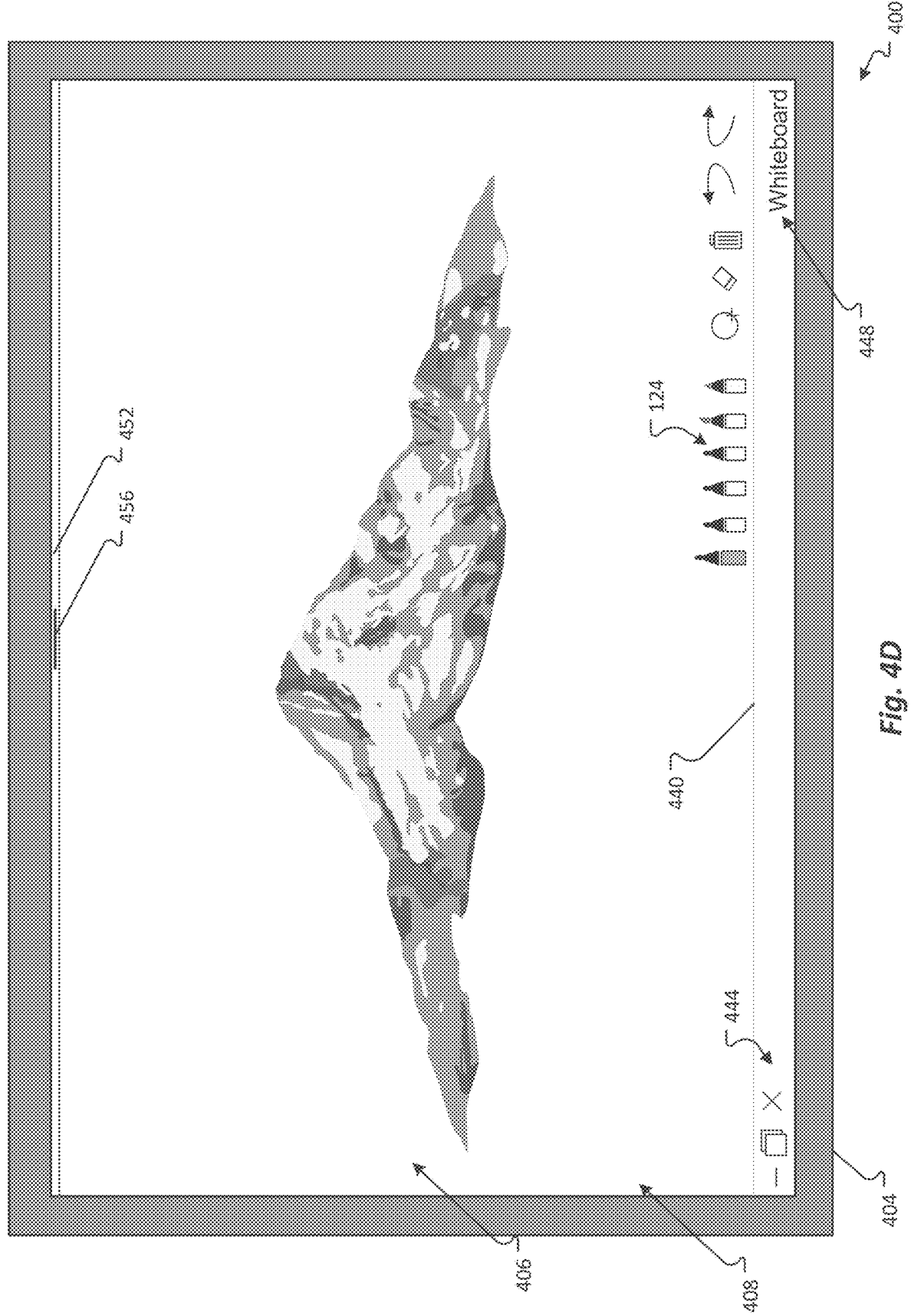
FIG. 4D depicts a title bar in a maximized, or proud, state in the lower left quadrant in accordance with examples of the present disclosure.
Figure 5D:
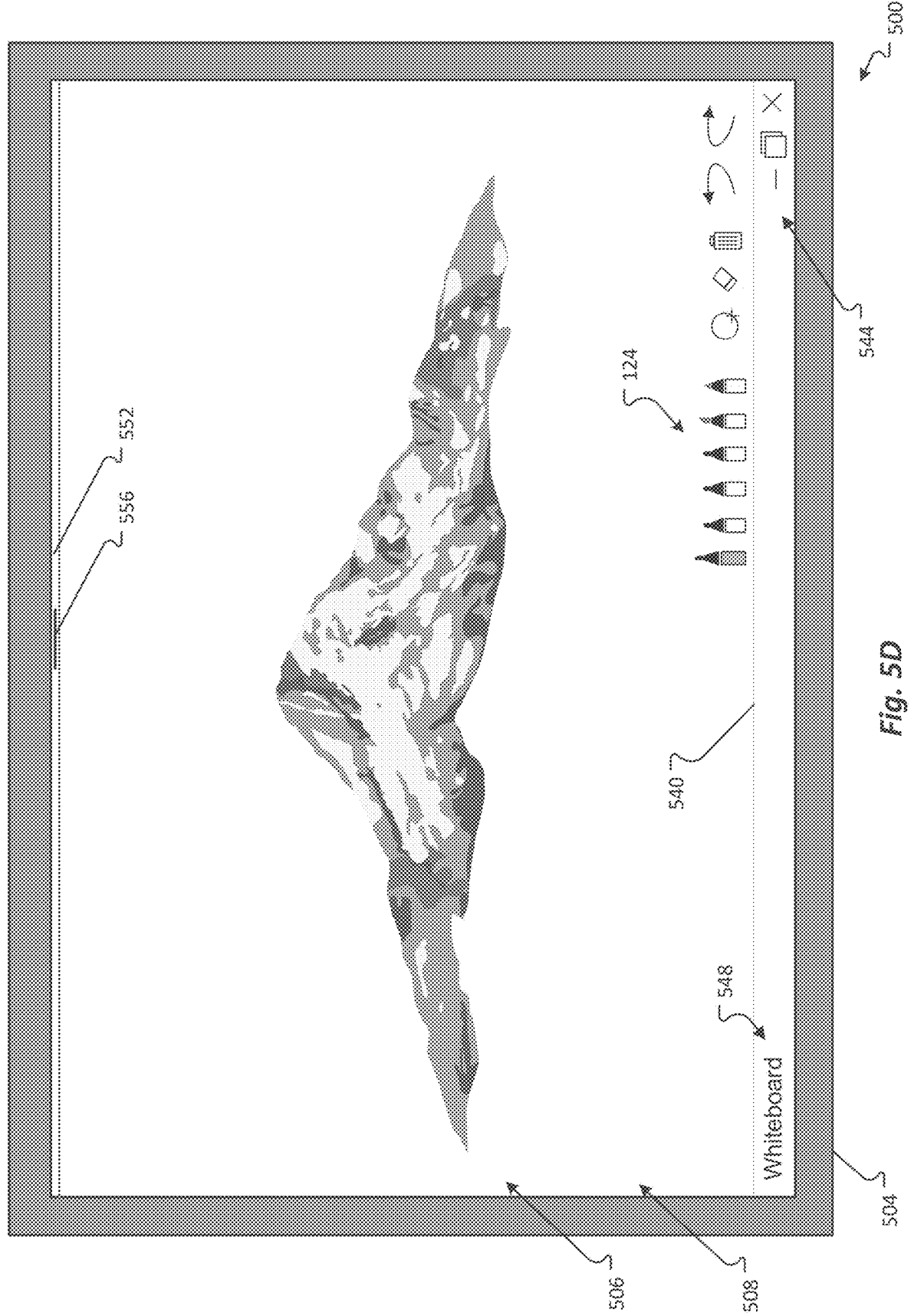
FIG. 5D depicts a title bar in a maximized, or proud, state in the lower right quadrant in accordance with examples of the present disclosure.

The method starts at 904, where flow may proceed to 908. At 908, a first selection indication may be received at a touch interface of a display. The selection indication may correspond to actual contact with a touch interface of the display; in some examples, the selection indication may be received as a non-contact type of selection. For example, a finger or stylus approaching the touch interface may cause a selection indication event to be received. The selection indication may be received at the touch interface of the display, such as the large-format display 104. In some examples, the selection indication may be received from another sensor, such as a camera. The selection indication may then be communicated to the operation system of the large-format display. The selection indication may correspond to a type of gesture (e.g., touch, press, swipe, etc.) and may include location information. At 912, the location of the selection indication may be determined. For example, the location may correspond to an X,Y coordinate and/or a partition area, such as a quadrant of the touch display. At 916, if the first selection indication is at a background displayed at a touch interface, such as the wall paper, the method may proceed to 920 where an application may be rendered to the display and provided to the user. At 924, the method 900 may receive a second selection indication at the touch display; this second selection indication may correspond to a selection of an application in the menu. Accordingly, at 928, the selected application may be launch such that the application displays content in an application window. The method 900 may proceed to 932, to determine the location to provide the shy title bar and to determine the location to provide the caption controls on a proud title bar when the shy title bar is maximized. For example, as depicted in FIGS. 4D and 5D, the location of the caption controls may be based on one or more locations of the first or second selection indications. As another example, the location of the caption controls and the title bar may be based on the locations of the first and/or second indications such that the shy title bar is rendered at a left side of a window displayed at the large-format display, as depicted in FIG. 3A. Accordingly, based on the location of the first and/or second selection indications, a location of the shy title bar and caption controls may be determined and rendered to the display at 936. The method 900 may end at 940.

Figure 10:
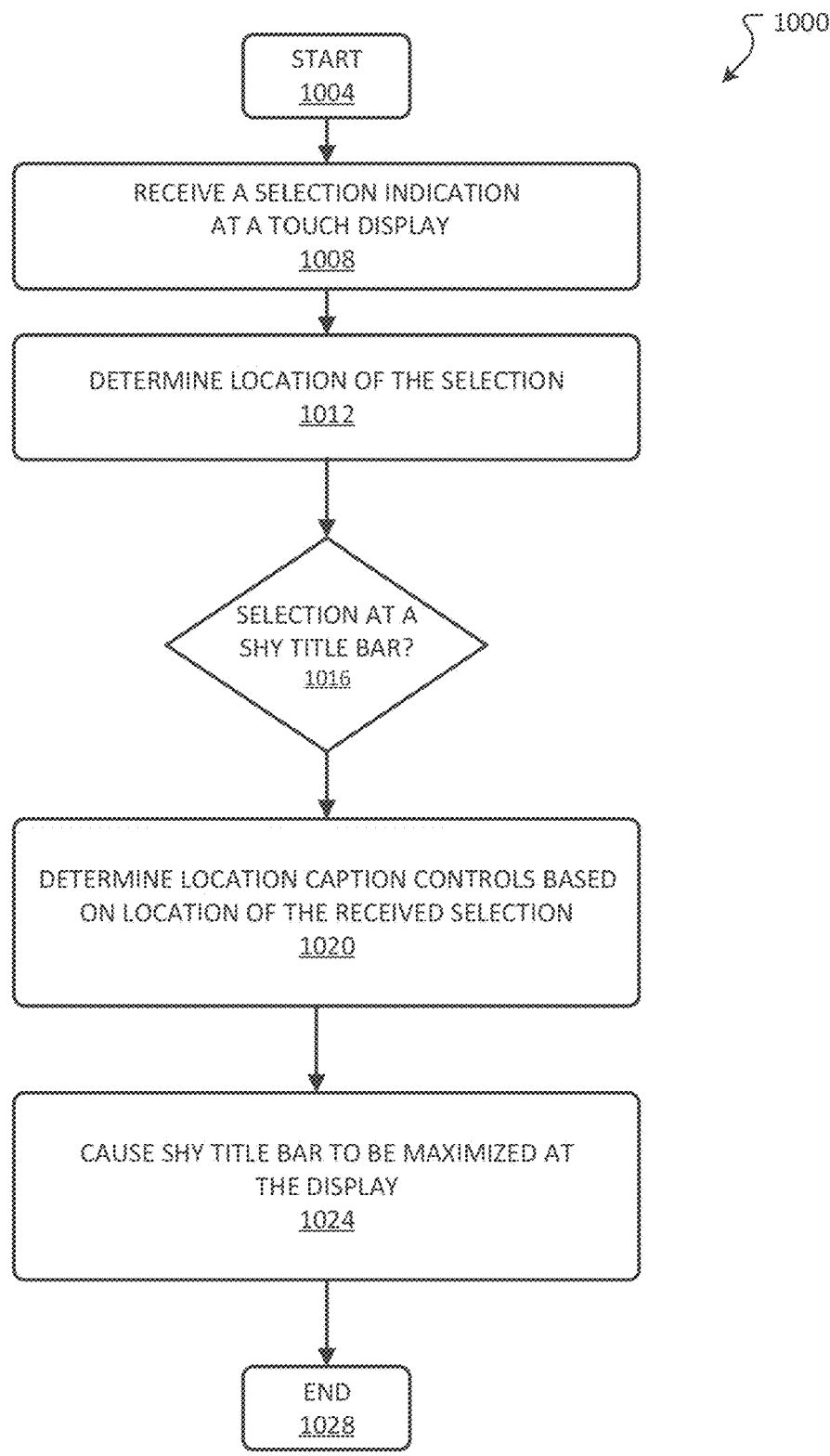
FIG. 10 depicts a third flow chart in accordance with examples of the present disclosure.

FIG. 10 depicts details of a method 1000 for causing a title bar in the minimize, or shy, state and the title bar's associated caption controls to be rendered to a display and displayed to a user in accordance with examples of the present disclosure. A general order for the steps of the method 1000 is shown in FIG. 10. Generally, the method 1000 starts at 1004 and ends at 1028. The method 1000 may include more or fewer steps or may arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, Application Specific Integrated Circuit (ASIC), a field programmable gate array (FPGA), a system on chip (SOC), or other hardware device. Hereinafter, the method 1000 shall be explained with reference to the systems, components, modules, software, data structures, user interfaces, etc. described in conjunction with FIGS. 1-9B.

Figure 3B:
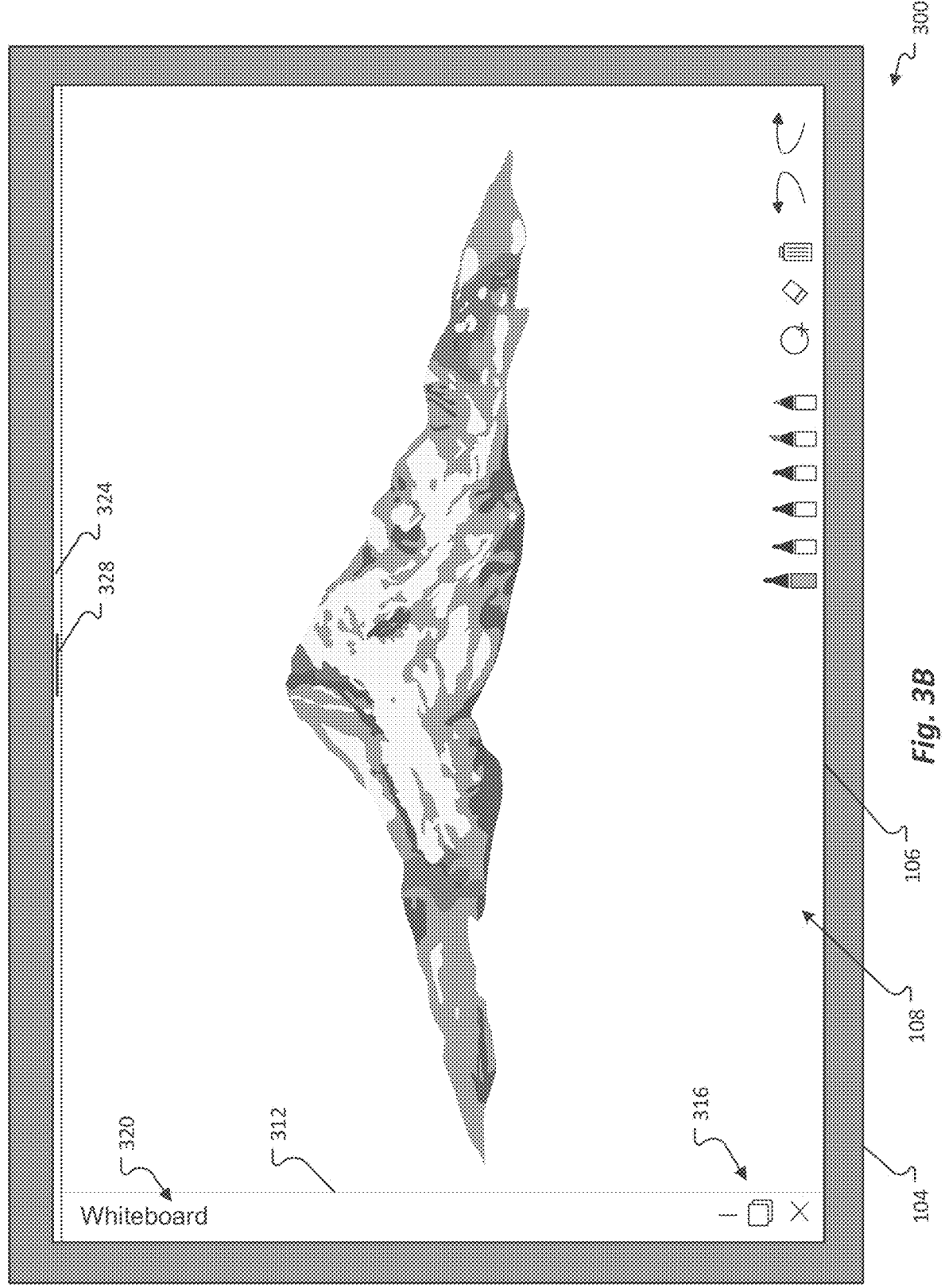
FIG. 3B depicts a title bar a title bar in a maximized, or proud, state along the left edge in accordance with examples of the present disclosure.

The method starts at 1004, where flow may proceed to 1008. At 1008, a selection indication may be received at a touch interface of a display. The selection indication may correspond to actual contact with a touch interface of the display; in some examples, the selection indication may be received as a non-contact type of selection. For example, a finger or stylus approaching the touch interface may cause a selection indication event to be received. The selection indication may be received at the touch interface of the display, such as the large-format display 104. In some examples, the selection indication may be received from another sensor, such as a camera. The selection indication may then be communicated to the operation system of the large-format display. The selection indication may correspond to a type of gesture (e.g., touch, press, swipe, etc.) and may include location information. At 1012, the location of the selection indication may be determined. For example, the location may correspond to an X,Y coordinate and/or a partition area, such as a quadrant of the touch display. The method 1000 may the proceed to 1016, where the operating system may determine if the location of the selection indication corresponds to a title bar in the minimized, or shy, state. If the location of the selection indication corresponds to the shy title bar, the operating system may determine a location to place the caption controls within a proud title bar based on the location of the selection indication. For example, if the location of the selection indication is at a bottom left quadrant of the touch interface, the operating system may place the caption controls at the left side of a maximized title bar, as depicted in FIG. 4D. As another example, if the location of the selection indication is at a bottom left quadrant of the touch interface, the operating system may place the caption controls at the bottom left side of a maximized title bar, as depicted in FIG. 3B. Accordingly, the shy title bar may be maximized at the display at 1024, such that a title bar is displayed with caption controls corresponding to the location of the selection indication.

Figure 11:
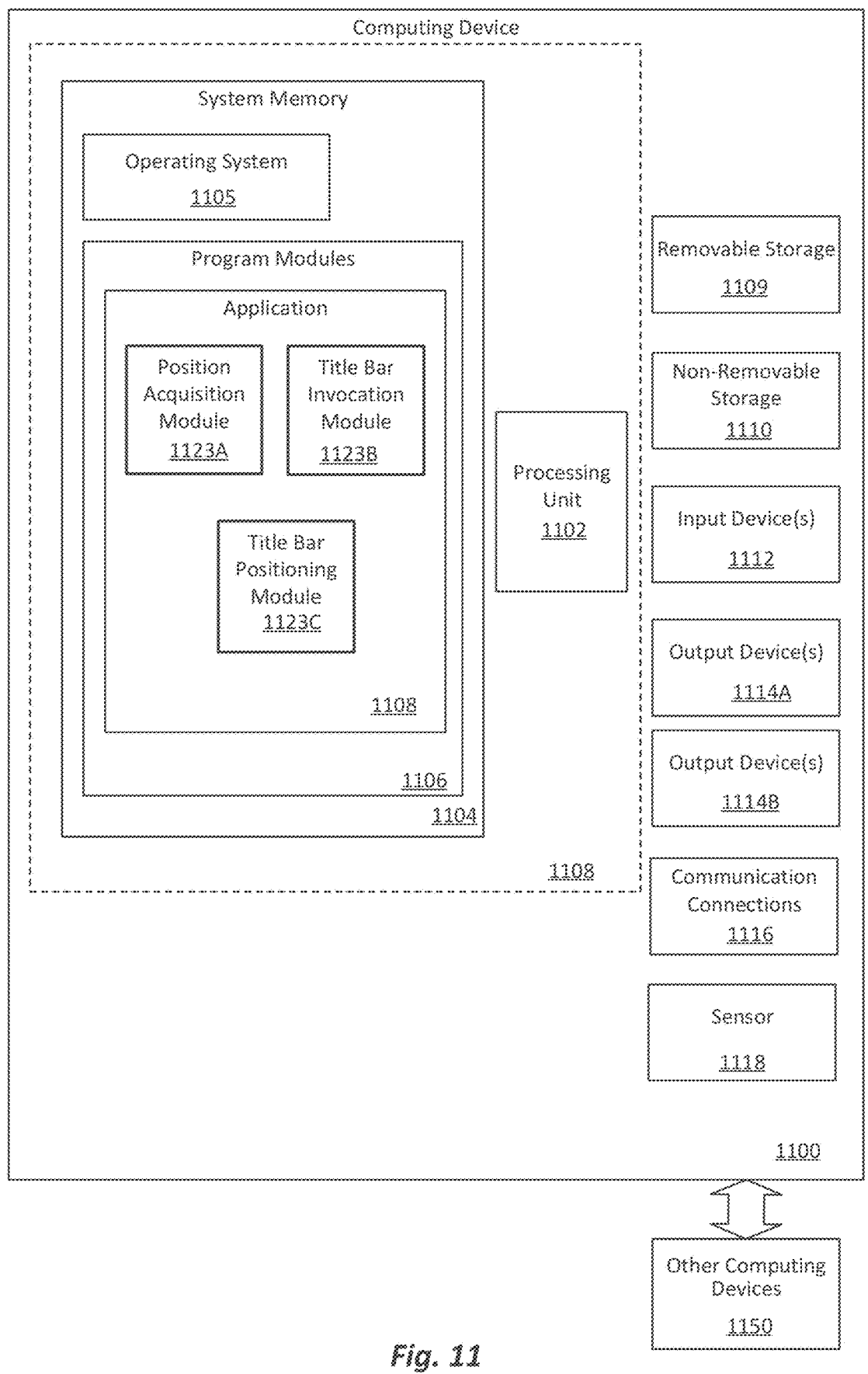
FIG. 11 depicts an example computing device with which aspects of the disclosure may be practiced.
Figure 12A:
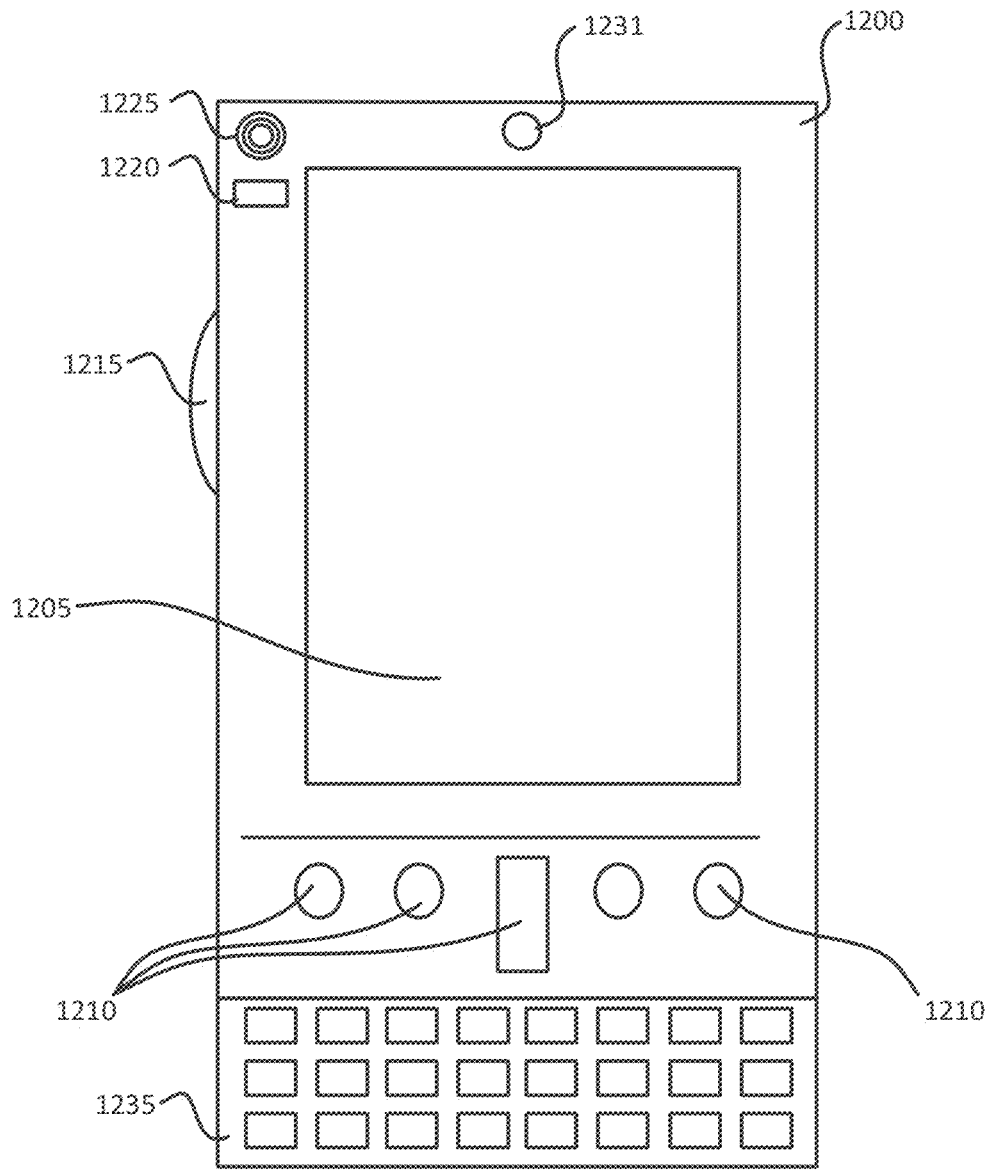
FIG. 12A illustrates a first example of a computing device with which aspects of the disclosure may be practiced.
Figure 12B:
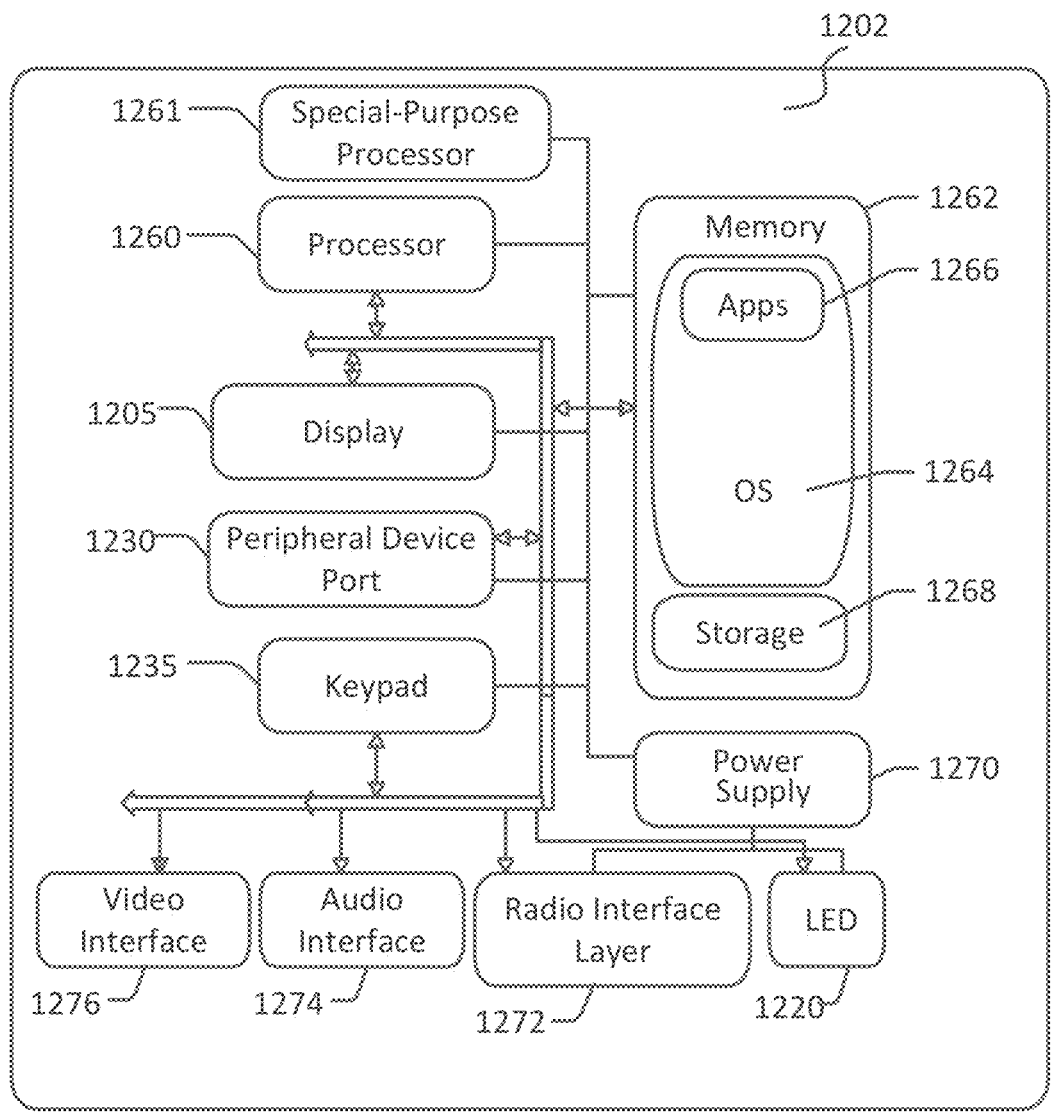
FIG. 12B illustrates a second example of a computing device with which aspects of the disclosure may be practiced.

FIGS. 11-12B and the associated descriptions provide a discussion of a variety of operating environments in which aspects of the disclosure may be practiced. However, the devices and systems illustrated and discussed with respect to FIGS. 11-12B are for purposes of example and illustration and are not limiting of a vast number of computing device configurations that may be utilized for practicing aspects of the disclosure, described herein.

FIG. 11 is a block diagram illustrating physical components (e.g., hardware) of a computing device 1100 with which aspects of the disclosure may be practiced. The computing device components described below may be suitable for the computing devices described above. For example, the computing device 1100 may correspond to a computing device in the large-format display 104. In a basic configuration, the computing device 1100 may include at least one processing unit 1102 and a system memory 1104. Depending on the configuration and type of computing device, the system memory 1104 may comprise, but is not limited to, volatile storage (e.g., random access memory), non-volatile storage (e.g., read-only memory), flash memory, or any combination of such memories.

The system memory 1104 may include an operating system 1105 and one or more program modules 1106 suitable for running software applications 1120, such as but not limited to a position acquisition module 1123A, a title bar invocation module 1123B, and a title bar position module 1123C and/or one or more components supported by the systems described herein. For example, the position acquisition module 1123A may determine a location of a selection indication discussed with respect to FIGS. 7A-10 and/or where a touch indication and/or approach is received with respect to FIGS. 2-6C. The tittle bar invocation module 1123B may cause a shy title bar to transition to a proud title bar as previously discussed. The title bar position module 1123C may determine a location to render and/or display a title bar, such as a shy title bar and/or a proud title bar as previously discussed. In addition, the title bar position module 1123C may determine where one or more caption controls should be located in a maximized, or proud, title bar as previously described. The operating system 1105, for example, may be suitable for controlling the operation of the computing device 1100.

Furthermore, embodiments of the disclosure may be practiced in conjunction with a graphics library, other operating systems, or any other application program and is not limited to any particular application or system. This basic configuration is illustrated in FIG. 11 by those components within a dashed line 1108. The computing device 1100 may have additional features or functionality. For example, the computing device 1100 may also include additional data storage devices (removable and/or non-removable) such as, for example, magnetic disks, optical disks, or tape. Such additional storage is illustrated in FIG. 11 by a removable storage device 1109 and a non-removable storage device 1110.

As stated above, a number of program modules and data files may be stored in the system memory 1104. While executing on the at least one processing unit 1102, the program modules 1106 may perform processes including, but not limited to, one or more aspects, as described herein. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 11 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1100 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1100 may also have one or more input device(s) 1112 such as a keyboard, a mouse, a pen, a sound or voice input device, a touch or swipe input device, etc. The output device(s) 1114A such as a display, speakers, a printer, etc. may also be included. In addition, the computing device 1100 may include a sensor 1118 for providing a location signal associated with a selection indication and/or an approaching finger, device, or otherwise that is in close proximity to the touch interface of the computing device 1100. The aforementioned devices are examples and others may be used. The computing device 1100 may include one or more communication connections 1116 allowing communications with other computing devices 1150. Examples of suitable communication connections 1116 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1104, the removable storage device 1109, and the non-removable storage device 1110 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1100. Any such computer storage media may be part of the computing device 1100. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 12A and 12B illustrate a computing device or mobile computing device 1200, for example, a mobile telephone, a smart phone, wearable computer (such as a smart watch), a tablet computer, a laptop computer, and the like, with which aspects of the disclosure may be practiced. That is, in some examples, the aspects of the present disclosure may be applicable to other devices and may not be limited to large-format displays. With reference to FIG. 12A, one aspect of a mobile computing device 1200 for implementing the aspects is illustrated. In a basic configuration, the mobile computing device 1200 is a handheld computer having both input elements and output elements. The mobile computing device 1200 typically includes a display 1205 and one or more input buttons 1210 that allow the user to enter information into the mobile computing device 1200. The display 1205 of the mobile computing device 1200 may also function as an input device (e.g., a touch screen display). If included, an optional side input element 1215 allows further user input. The side input element 1215 may be a rotary switch, a button, or any other type of manual input element. In alternative aspects, mobile computing device 1200 may incorporate more or less input elements. For example, the display 1205 may not be a touch screen in some aspects. In yet another alternative aspect, the mobile computing device 1200 is a portable phone system, such as a cellular phone. The mobile computing device 1200 may also include an optional keypad 1235. Optional keypad 1235 may be a physical keypad or a "soft" keypad generated on the touch screen display. In various aspects, the output elements include the display 1205 for showing a graphical user interface (GUI), a visual indicator 1231 (e.g., a light emitting diode), and/or an audio transducer 1225 (e.g., a speaker). In some aspects, the mobile computing device 1200 incorporates a vibration transducer for providing the user with tactile feedback. In yet another aspect, the mobile computing device 1200 incorporates input and/or output ports, such as an audio input (e.g., a microphone jack), an audio output (e.g., a headphone jack), and a video output (e.g., a HDMI port) for sending signals to or receiving signals from an external source.

FIG. 12B is a block diagram illustrating the architecture of one aspect of computing device, a server, or a mobile computing device. That is, the computing device 1200 can incorporate a system (e.g., an architecture) 902 to implement some aspects. The system 1202 can implemented as a large-format display and/or laptop for example capable of running one or more applications (e.g., browser, e-mail, calendaring, contact managers, messaging clients, games, and media clients/players). In some aspects, the system 1202 is integrated as a computing device, such as a desktop computer.

One or more application programs 1266 may be loaded into the memory 1262 and run on or in association with the operating system 1264. Examples of the application programs include phone dialer programs, e-mail programs, personal information management (PIM) programs, word processing programs, spreadsheet programs, Internet browser programs, messaging programs, and/or one or more components supported by the systems described herein. The system 1202 also includes a non-volatile storage area 1268 within the memory 1262. The non-volatile storage area 1268 may be used to store persistent information that should not be lost if the system 1202 is powered down. The application programs 1266 may use and store information in the non-volatile storage area 1268, such as e-mail or other messages used by an e-mail application, and the like. A synchronization application (not shown) also resides on the system 1202 and is programmed to interact with a corresponding synchronization application resident on a host computer to keep the information stored in the non-volatile storage area 1268 synchronized with corresponding information stored at the host computer. As should be appreciated, other applications may be loaded into the memory 1262 and run on the computing device 1200 described herein.

The system 1202 has a power supply 1270, which may be implemented as one or more batteries. The power supply 1270 might further include an external power source, such as an AC adapter or a powered docking cradle that supplements or recharges the batteries. The system 1202 may also include a radio interface layer 1272 that performs the function of transmitting and receiving radio frequency communications. The radio interface layer 1272 facilitates wireless connectivity between the system 1202 and the "outside world," via a communications carrier or service provider. Transmissions to and from the radio interface layer 1272 are conducted under control of the operating system 1264. In other words, communications received by the radio interface layer 1272 may be disseminated to the application programs 1266 via the operating system 1264, and vice versa.

The visual indicator 1220 may be used to provide visual notifications, and/or an audio interface 1274 may be used for producing audible notifications via the audio transducer 1225. In the illustrated configuration, the visual indicator 1220 is a light emitting diode (LED) and the audio transducer 1225 is a speaker. These devices may be directly coupled to the power supply 1270 so that when activated, they remain on for a duration dictated by the notification mechanism even though the processor 1260 and other components might shut down for conserving battery power. The LED may be programmed to remain on indefinitely until the user takes action to indicate the powered-on status of the device. The audio interface 1274 is used to provide audible signals to and receive audible signals from the user. For example, in addition to being coupled to the audio transducer 1225, the audio interface 1274 may also be coupled to a microphone to receive audible input, such as to facilitate a telephone conversation. In accordance with aspects of the present disclosure, the microphone may also serve as an audio sensor to facilitate control of notifications, as will be described below. The system 1202 may further include a video interface 1276 that enables an operation of an on-board camera to record still images, video stream, and the like.

A computing device 1200 implementing the system 1202 may have additional features or functionality. For example, the computing device 1200 may also include additional data storage devices (removable and/or non-removable) such as, magnetic disks, optical disks, or tape. Such additional storage is illustrated in FIG. 12B by the non-volatile storage area 1268. Data/information generated or captured by the computing device 1200 and stored via the system 1202 may be stored locally on the computing device 1200, as described above, or the data may be stored on any number of storage media that may be accessed by the device via the radio interface layer 1272 or via a wired connection between the computing device 1200 and a separate computing device associated with the mobile computing device 1200, for example, a server computer in a distributed computing network, such as the Internet. As should be appreciated such data/information may be accessed via the mobile computing device 1200 via the radio interface layer 1272 or via a distributed computing network. Similarly, such data/information may be readily transferred between computing devices for storage and use according to well-known data/information transfer and storage means, including electronic mail and collaborative data/information sharing systems.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together. The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably. The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material." Any of the steps, functions, and operations discussed herein can be performed continuously and automatically.

The exemplary systems and methods of this disclosure have been described in relation to computing devices. However, to avoid unnecessarily obscuring the present disclosure, the preceding description omits a number of known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

In accordance with examples of the present disclosure, a method for displaying a title bar at a display of a display device is provided. The method may include displaying a first title bar in a maximized state at a first location within a viewable region of the display device, displaying a second title bar in a minimized state at a second location within the viewable region of the display device, receiving a gesture at the display device, determining a third location within a viewable region of the display device associated with the received gesture, determining whether the third location associated with the gesture at least partially coincides with the second location displaying the second title bar in the minimized state, and in response to determining that the third location at least partially coincides with the second location, switching the second title bar from the minimized state to a maximized state.

In accordance with at least one aspect of the above method, the method may include receiving a second gesture at the display device, wherein the second location at least partially coincides with the fourth location within the viewable region of the display device. In accordance with at least one aspect of the above method, the method may include where the second gesture is a launch of an application. In accordance with at least one aspect of the above method, the method may include where the second gesture is an interaction with a toolbar of an application executed by the display device. In accordance with at least one aspect of the above method, the method may include where the second title bar in the maximized state includes one or more caption controls and the location of the one or more caption controls within the second title bar in the maximized state is based on the third location associated with the received gesture. In accordance with at least one aspect of the above method, the method may include switching the first title bar from the maximized state to a minimized state. In accordance with at least one aspect of the above method, the method may include where the received gesture at the display device is at least one of a press gesture, swipe gesture, or approach gesture. In accordance with at least one aspect of the above method, the method may include where the first title bar in the minimized state is displayed at a first edge of a displayed window that is opposite to a second edge of the displayed window, the second edge of the displayed window at least partially coinciding with the first location. In accordance with at least one aspect of the above method, the method may include where the third location at least partially coincides with the second location when the third location is within a predetermined distance of the second location. In accordance with at least one aspect of the above method, the method may include where the third location at least partially coincides with the second location when the third location and the second location are within a same quadrant within the viewable region of the display device.

In accordance with at least one example of the present disclosure, a display device is provided. The display device may include a processor, memory including instructions which when executed by the processor, causes the processor to display a first title bar in a maximized state at a first location within a viewable region of the display device, display a second title bar in a minimized state at a second location within the viewable region of the display device, receive a gesture at the display device, determine a third location within a viewable region of the display device associated with the received gesture, determine if the third location associated with the gesture at least partially coincides with the second location displaying the first title bar in the minimized state, in response to determining that the third location at least partially coincides with the second location, switch the second title bar from the minimized state to a maximized state, and switch the first title bar from the maximized state to a minimized state.

In accordance with at least one aspect of the above display device, the memory may include instructions, which when executed by the processor, cause the processor to receive a second gesture at the display device, wherein the second location at least partially coincides with the fourth location within the viewable region of the display device. In accordance with at least one aspect of the above display device, the second gesture may be a launch of an application or an interaction with a toolbar of an application executed by the display device. In accordance with at least one aspect of the above display device, the second title bar in the maximized state includes one or more caption controls and the location of the one or more caption controls within the second title bar in the maximized state is based on the third location associated with the received gesture. In accordance with at least one aspect of the above display device, the received gesture at the display device is at least one of a press gesture, swipe gesture, or approach gesture.

In accordance with at least one example of the present disclosure, a method for displaying a title bar at a display of a display device is provided. The method may include displaying a first title bar in a maximized state at a first location within a viewable region of the display device, receiving a gesture at the display device, determining a second location within a viewable region of the display device associated with the received gesture, displaying a second title bar in a minimized state at a third location coinciding with the second location within the viewable region of the display device, receiving a second gesture at the display device, determining a fourth location within the viewable region of the display device associated with the received second gesture, determining if the fourth location associated with the second gesture at least partially coincides with the third location, and in response to determining that the fourth location at least partially coincides with the third location, switching the second title bar from the minimized state to a maximized state.

In accordance with at least one aspect of the above method, the method may include where the first gesture is a launch of an application or an interaction with a toolbar of an application executed by the display device. In accordance with at least one aspect of the above method, the method may include where the second title bar in the maximized state includes one or more caption controls and the location of the one or more caption controls within the second title bar in the maximized state is based on the fourth location associated with the received second gesture. In accordance with at least one aspect of the above method, the method may include switching the first title bar from the maximized state to a minimized state. In accordance with at least one aspect of the above method, the method may include moving the second title bar in the minimized state to another location within the viewable region of the display device.

The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

What is claimed is:

1. A method for displaying a title bar at a display of a display device, the method comprising:
    displaying a first title bar in a maximized state at a first location within a viewable region of the display device, wherein the first title bar is for a window displayed within the viewable region of the display device;
    displaying a second title bar in a minimized state at a second location within the viewable region of the display device, wherein the second title bar is for the window displayed within the viewable region of the display device, and wherein the second title bar is displayed at a same time as the first title bar;
    receiving an input gesture at the display device;
    determining whether the input gesture is received at the second location displaying the second title bar in the minimized state; and
    in response to determining that the input gesture is received at the second location:
        transitioning the second title bar from the minimized state to a maximized state, wherein a dimension of the second title bar in the minimized state is smaller than the dimension of the second title bar in the maximized state; and
        transitioning the first title bar from the maximized state to a minimized state, wherein a dimension of the first title bar in the maximized state is larger than the dimension of the first title bar in the minimized state.

2. The method of claim 1, further comprising:
    receiving a second input gesture at the display device; and
    based on a location associated with the received second input gesture, causing an application to launch such that a window associated with the launched application is rendered at the display device.

3. The method of claim 1, further comprising:
    receiving a second input gesture at the display device; and
    based on a location associated with the received second input gesture, causing an interaction to occur with a toolbar of an application, wherein the toolbar of the application is displayed at the display device.

4. The method of claim 1, causing one or more caption controls to be displayed in the second title bar when the second title bar is in the maximized state, wherein the caption control is displayed at a location associated with the received input gesture.

5. The method of claim 1, wherein the received input gesture is at least one of a press gesture, swipe gesture, or approach gesture.

6. The method of claim 1, wherein the first title bar in the minimized state is displayed at a first edge of the window that is opposite to a second edge of the window.

7. The method of claim 1, wherein the input gesture is determined to be received at the second location when a location associated with the input gesture is within a predetermined distance of the second location.

8. The method of claim 1, wherein the input gesture is determined to be received at the second location when a location associated with the input gesture is within a same quadrant of the viewable region of the display device as the second location.

9. The method of claim 1, wherein the second title bar in the minimized state includes a locator associated with the second location.

10. The method of claim 1, wherein the dimension is a number of pixels.

11. A display device comprising:
a processor; and
memory including instructions which when executed by the processor, cause the processor to:
display a first title bar in a maximized state at a first location within a viewable region of the display device, wherein the first title bar is for a window displayed within the viewable region of the display device;
display a second title bar in a minimized state at a second location within the viewable region of the display device, wherein the second title bar is for the window displayed within the viewable region of the display device, and wherein the second title bar is displayed at a same time as the first title bar;
receive an input gesture at the display device;
determine if the input gesture is received at the second location displaying the second title bar in the minimized state;
in response to determining that the input gesture is received at the second location:
transition the second title bar from the minimized state to a maximized state, wherein a height of the second title bar in the minimized state is less than the height of the second title bar in the maximized state, and
transition the first title bar from the maximized state to a minimized state, wherein a height of the first title bar in the maximized state is greater than the height of the first title bar in the minimized state.

12. The system of claim 11, wherein the instructions, which when executed by the processor, cause the processor to
receive a second input gesture at the display device; and
based on a location associated with the received second input gesture, cause an application to launch such that a window associated with the launched application is rendered at the display device.

13. The system of claim 11, wherein the instructions, which when executed by the processor, cause the processor to:
receive a second input gesture at the display device; and
based on a location associated with the received second input gesture, cause an interaction with a toolbar of an application, wherein the toolbar of the application is displayed at the display device.

14. The system of claim 11, wherein the second title bar in the maximized state includes one or more caption controls, and wherein the location of the one or more caption controls within the second title bar in the maximized state is based on a location associated with the received input gesture.

15. The system of claim 11, wherein the received input gesture is at least one of a press gesture, swipe gesture, or approach gesture.

16. A method for displaying a title bar at a display of a display device, the method comprising:
displaying a first title bar in a maximized state at a first location within a viewable region of the display device, wherein the first title bar is for a window displayed within the viewable region of the display device;
displaying a second title bar in a minimized state at a second location within the viewable region of the display device, wherein the second title bar is for the window displayed within the viewable region of the display device, and wherein the second title bar is displayed at a same time as the first title bar;
receiving an input gesture at the display device;
determining whether the input gesture is received at a gripper of the second title bar;
in response to determining that the input gesture is received at the gripper of the second title bar:
transition the second title bar from the minimized state to a maximized state, wherein the second title bar in the minimized state is smaller than the second title bar in the maximized state, and
transition the first title bar from the maximized state to a minimized, wherein the first title bar in the maximized state is larger than the first title bar in the minimized state.

17. The method of claim 16, further comprising:
receiving a second input gesture; and
based on a location associated with the received second input gesture, causing an application to launch such that a window associated with the launched application is rendered at the display device.

18. The method of claim 16, wherein the second title bar in the maximized state includes one or more caption controls, and wherein the location of the one or more caption controls within the second title bar in the maximized state is based on the received input gesture.

19. The method of claim 16, further comprising moving the second title bar in the minimized state to another location within the viewable region of the display device.

* * * * *